United States Patent [19]

Matsushita et al.

[11] Patent Number: 5,937,201
[45] Date of Patent: Aug. 10, 1999

[54] MANAGEMENT SYSTEM AND METHOD FOR PARALLEL COMPUTER SYSTEM

[75] Inventors: Masayuki Matsushita, Hadano; Atsushi Ugajin, Sagamihara, both of Japan

[73] Assignee: Hitachi, Ltd., Tokyo, Japan

[21] Appl. No.: 08/721,258

[22] Filed: Sep. 26, 1996

[30] Foreign Application Priority Data

Sep. 28, 1995 [JP] Japan .................................. 7-251427

[51] Int. Cl.[6] ...................................................... G06F 1/00
[52] U.S. Cl. ................ 395/750.02; 395/823; 395/200.53
[58] Field of Search ........................ 395/750.02, 200.54, 395/200.53, 800.31, 800.32, 800.34

[56] References Cited

U.S. PATENT DOCUMENTS

| | | | |
|---|---|---|---|
| 4,547,849 | 10/1985 | Louie et al. | 395/823 |
| 4,780,714 | 10/1988 | Moustakas et al. | 340/825.5 |
| 5,404,559 | 4/1995 | Bonella et al. | 395/307 |
| 5,652,892 | 7/1997 | Ugajin | 395/750.02 |
| 5,675,798 | 10/1997 | Chang | 395/200.54 |
| 5,679,945 | 10/1997 | Renner et al. | 235/492 |

FOREIGN PATENT DOCUMENTS 5-120247  5/1993  Japan .

Primary Examiner—Robert B. Harrell
Assistant Examiner—David M. Ovedovitz
Attorney, Agent, or Firm—Antonelli, Terry, Stout & Kraus, LLP

[57] ABSTRACT

A management system for a parallel computer system having a control terminal for collectively controlling the maintenance and management of a plurality of nodes constituting the parallel computer system. In the management system, each of a plurality of nodes includes: a main processor operated with a main power source of the node for performing parallel processing; a sub-processor operated with an auxiliary power source of the node for executing a system control command for controlling the main processor; and a system control adapter operated with the auxiliary power source for communications with the control terminal for the system control and for controlling the sub-processor, the control terminal includes a system control adapter for communications with a plurality of system control adapters of the plurality of nodes, and the parallel computer system includes a system control interface for connecting the plurality of system control adapters of the plurality of nodes to the system control adapter of the control terminal and for transmitting the system control command for the maintenance and management of a plurality of main processors of the plurality of nodes, from the control terminal to a plurality of sub-processors of the plurality of nodes.

25 Claims, 14 Drawing Sheets

MANAGEMENT SYSTEM AND METHOD FOR PARALLEL COMPUTER SYSTEM

BACKGROUND OF THE INVENTION

1. Field of the Invention

The present invention relates to a management system and method for a parallel computer system, and more particularly to techniques suitable for application to a management system for a parallel computer system capable of controlling maintenance and management of a plurality of nodes constituting the parallel computer system even if main processors at the nodes are not running.

2. Description of the Related Art

Many maintenance and management systems and methods have been proposed for a computer system having a plurality of computers.

A console display for concentrated maintenance and management of a plurality of UNIX machines is disclosed in JP-A-6-214763. With this technique, a load increase in maintenance and management can be prevented and a single console is used for a plurality of UNIX machines.

In summary of this technique, a center console at a server for concentrated maintenance and management of a plurality of UNIX machines is provided with a destination table which stores command destinations for each type of maintenance and management, and each command is executed by using the destination table.

A console switching control method for a composite computer system constituted by a plurality of computers is disclosed in JP-A-5-120247 which can avoid erroneous maintenance and management of each computer connected to a single system console.

In summary of this technique, service processors of a plurality of computers are connected to a switch system to which the system console is connected. The system console sequentially switches computers having output messages by using identifiers discriminating between computers to thereby share the single system console by a plurality of computers. Maintenance and management of each computer by the system console is permitted when an identifier used for switching to each computer coincides with an identifier of the switched computer itself connected to the system console.

A concentrated message management system for concentrically managing massages from a plurality of computers constituting a distributed processing system is disclosed in JP-A-5-20281.

In summary of this technique, a concentrated management node is selected from a plurality of computers connected to the network, and the concentrated management node concentrically manages operation state messages at other nodes.

The present inventors have studied the above conventional techniques and found the following problems.

The above-described conventional management system for the computer system constituted by a plurality of computers utilizes the functions provided by network software running on each computer under management. Therefore, if the computer under management is not running, if the operating system is not running, or if the network software is not active, maintenance and management are impossible.

In the case of the single console display for concentrated maintenance and management for a plurality of UNIX machines, it is required for each computer to run a UNIX operation system. If this operating system is not running, the concentrated maintenance and management by the console display are impossible.

In the case of the switch system at the system console for a composite computer system, the switch system is connected between the system console and each service processor. Therefore, specific hardware of the switching system is required.

In the case of the concentrated message management system, messages are transmitted to the concentrated management node from a plurality of computers. Therefore, if the system of this concentrated management node is shut down, concentrated message management is impossible. Furthermore, since each message is transmitted via nodes of the network, the state of each node cannot be managed by the concentrated management node if the operating system of each node and the network are not active.

SUMMARY OF THE INVENTION

It is an object of the present invention to provide technology allowing a control terminal to collectively conduct maintenance and management of a plurality of nodes constituting a parallel computer system, independently from the operation of main processors executing parallel processing and from the operation of the operating system and network software at each main processor.

It is another object of the present invention to provide technology allowing a control terminal to collectively or singularly turn on or off the power source at each of a plurality of nodes constituting a parallel computer system.

It is another object of the present invention to provide technology capable of reducing rush current at a power source facility for supplying power to a parallel computer system.

It is another object of the present invention to provide technology allowing a control terminal to monitor whether a plurality of nodes constituting a parallel computer system are operating normally.

It is another object of the present invention to provide technology allowing a control terminal to collectively manage node messages issued from main processors at a plurality of nodes constituting a parallel computer system even if each node issued the message stops its operation thereafter.

It is another object of the present invention to provide technology allowing a control terminal to collectively manage the contents in a main memory and registers at each of a plurality of nodes constituting a parallel computer system when a fault occurs at some node.

It is another object of the present invention to provide technology allowing a control terminal to collectively reset a main processor at each of a plurality of nodes constituting a parallel computer system.

It is another object of the present invention to provide technology allowing a control terminal to start up the system of a main processor at each of a plurality of nodes constituting a parallel computer system even if a fault occurs at a specific bootstrap device of the node, by instructing to replace the failed bootstrap device.

It is another object of the present invention to provide technology capable of preventing a conflict among a plurality of control terminals of a parallel computer system.

It is another object of the present invention to provide technology capable of remotely controlling maintenance and management of a parallel computer system.

A typical one of aspects of the present invention will be briefly described in the following.

A management system having a control terminal for the maintenance and management of a parallel computer system with a plurality of computers constituting nodes being connected together, wherein: each of the plurality of nodes comprises: a main processor operated with a main power source of the node for performing parallel processing; a sub-processor operated with an auxiliary power source of the node for executing a system control command for controlling the main processor; and a system control adapter operated with the auxiliary power source for communications with the control terminal for the system control and for controlling the sub-processor; the control terminal comprises a system control adapter for communications with a plurality of system control adapters of the plurality of nodes; and the parallel computer system comprises a system control interface for connecting the plurality of system control adapters of the plurality of nodes to the system control adapter of the control terminal and for transmitting the system control command for the maintenance and management of a plurality of main processors of the plurality of nodes, from the control terminal to a plurality of sub-processors of the plurality of nodes.

In the management system for the parallel computer system, the system control command issued from the control terminal is transmitted to the sub-processors of the plurality of nodes, via the system control adapters of the plurality of nodes and of the control terminal, the system control adapters constituting the system control interface. The system control command transmitted to the sub-processors is executed by the sub-processors for the maintenance and management of the main processors.

In a conventional management system for a parallel computer system, the maintenance and management of a plurality of nodes constituting the parallel computer system are controlled by a general-purpose operating system running on a main processor for executing general parallel processing of the parallel computer system and by network software operating under the control of the operating system.

Therefore, in order to use a conventional management system for a parallel computer system, it is necessary that the main processors of the plurality of nodes constituting the parallel computer system under management operate normally and that the general-purpose operating system and network software are active. If the main processors of the plurality of nodes under management does not operate or the general-purpose operating system and network software are not active, the conventional management system for a parallel computer system cannot be used. For example, these cases include a case wherein a power of the parallel computer system is not turned on before the start of operation, a case wherein the operating system and the network are changed and the normal operation is being checked, and a case wherein the state of a specific node unable to operate is being checked because of an occurrence of a fault.

In the present management system for the parallel computer system, a sub-processor and a system control adapter operable irrespective of the operation state of the main processor are provided at all nodes constituting the parallel computer system. The system control adapter of each node is connected to the system control adapter of the control terminal via the network hub or the like.

The sub-processor and system control adapter provided at each node of the plurality of nodes operate with another auxiliary power source different from the main power source used by the main processor. The system control adapter communicates with the control terminal by using network software and a communication cable different from the network software running on the main processor and the communication cable used by this network software.

Accordingly, even if the main processor is not running, the main processor can be controlled by the control terminal if the sub-processor and system control adapter operates with the auxiliary power source.

As above, in the management system for the parallel computer system, to the system control adapter operated with the auxiliary power source and communicating with the control terminal by using network software and a communication cable different from the network software running on the main processor and the communication cable used by this network software, a system control command is transmitted from the control terminal and executed by the sub-processor operated with the auxiliary power source to control the main processors of the plurality of nodes. Accordingly, irrespective of the operation state of the main processor for executing parallel processing and the operation state of the operating system of the main processor and the network software, the control terminal can collectively control the maintenance and management of the plurality of nodes constituting the parallel computer system.

The above and other objects and novel features of the invention will become apparent from the detailed description of this specification when read in conjunction with the accompanying drawings.

DESCRIPTION OF THE PREFERRED EMBODIMENTS

Figure 1:
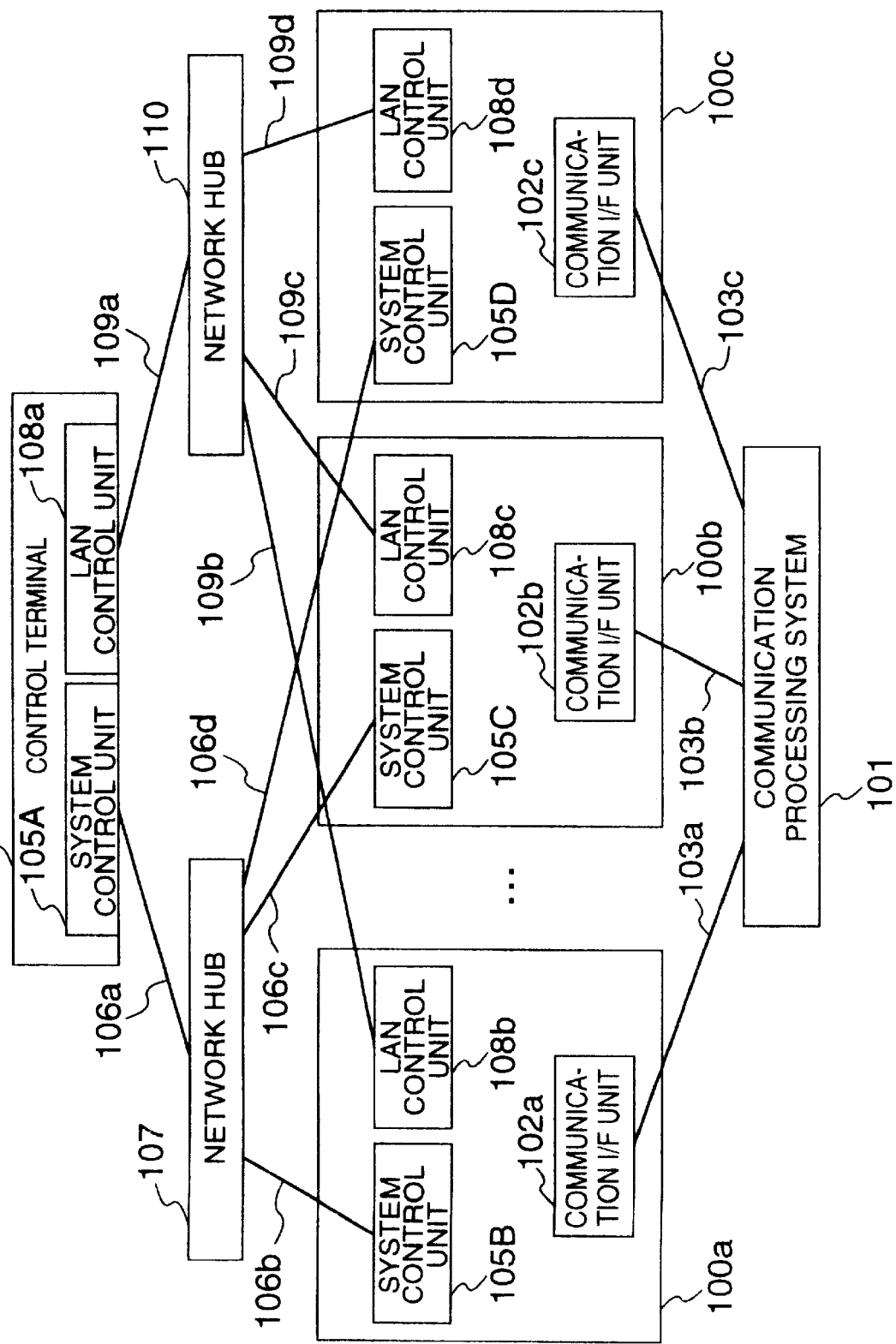
FIG. 1 shows the outline of the structure of a management system for a parallel computer system according to a first embodiment.

Embodiments of the invention will be described in detail with reference to the accompanying drawings. Elements having the same function in the drawings illustrating the embodiments are represented by identical reference numerals, and the description thereof is not given in duplicate.

1st Embodiment

The outline of the structure of a management system for a parallel computer system according to the first embodiment of this invention will be described.

FIG. 1 shows the outline of the structure of the management system for the parallel computer system of the first embodiment. In FIG. 1, reference numerals 100a to 100c represent a node, reference numeral 101 represents a communication processing system, reference numerals 102a to 102c represent a communication interface unit, reference numerals 103a to 103c represent a communication cable, reference numeral 104 represents a control terminal, reference numerals 105A to 105D represent a system control unit, reference numeral 106a to 106d represent a communication cable, reference numeral 107 represents a network hub (line concentrator), reference numeral 108a to 108d represent a LAN (Local Area Network) control unit, reference numeral 109a to 109d represent a communication cable, and reference numeral 110 represents a communication (network) hub.

As shown in FIG. 1, the management system for the parallel computer system of this embodiment includes the nodes 100a to 100c constituting the parallel computer system, the communication processing unit 101 for controlling communications between the nodes 100a to 100c during parallel processing, the control terminal 104 for controlling maintenance and management of the nodes 100a to 100c, and the network hub 107 for the interconnection between the control terminal 104 and nodes 100a to 100c. The management terminal 104 has the system control unit 105A and LAN control unit 108a. The node 100a has the communication interface unit 102a, system control unit 105B, and LAN control unit 108b. The node 100b has the communication interface unit 102b, system control unit 105C, and LAN control unit 108c. The node 100c has the communication interface unit 102c, system control unit 105D, and LAN control unit 108d.

Also as shown in FIG. 1, in the management system for the parallel computer system of this embodiment, the communication interface units 102a to 102c of the nodes 100a to 100c are interconnected by the communication cables 103a to 103c and communication processing system 101, the system control units 105B to 105D of the nodes 100a to 100c are connected via the communication cables 106a to 106d and network hub 107 to the system control unit 105A of the control terminal 104, and the LAN control units 108b to 108d of the nodes 100a to 100c are connected via the communication cables 109a to 109d and network hub 110 to the LAN control unit 108a of the control terminal 104.

System control interface of the management system for the parallel computer system of this embodiment is the interface which can be realized, as described above, by connecting the system control unit 105A of the control terminal 104 to the system control units 105B to 105D of the nodes 100a to 100c by the communication cable 106 such as Ethernet and the network hub 107 such as a multi-port repeater.

System support interface of the management system for the parallel computer system of this embodiment is the interface which can be realized by connecting the LAN control unit 108a of the control terminal 104 to the LAN control units 108b to 108d of the nodes 100a to 100c by the communication cable 109 such as Ethernet and the network hub 110 such as a multi-port repeater.

The system support interface is the interface for the maintenance and management of a conventional parallel computer system. This interface is used while the main processors of each node 100a to 100c is running, and controls the system maintenance and management such as displaying a message on the management terminal 104, the message being output in accordance with application software executed by the main processor of each node 100a to 100c.

Next, each node 100a to 100c constituting the parallel computer system in the management system for the parallel computer system of this embodiment will be described.

Figure 2:
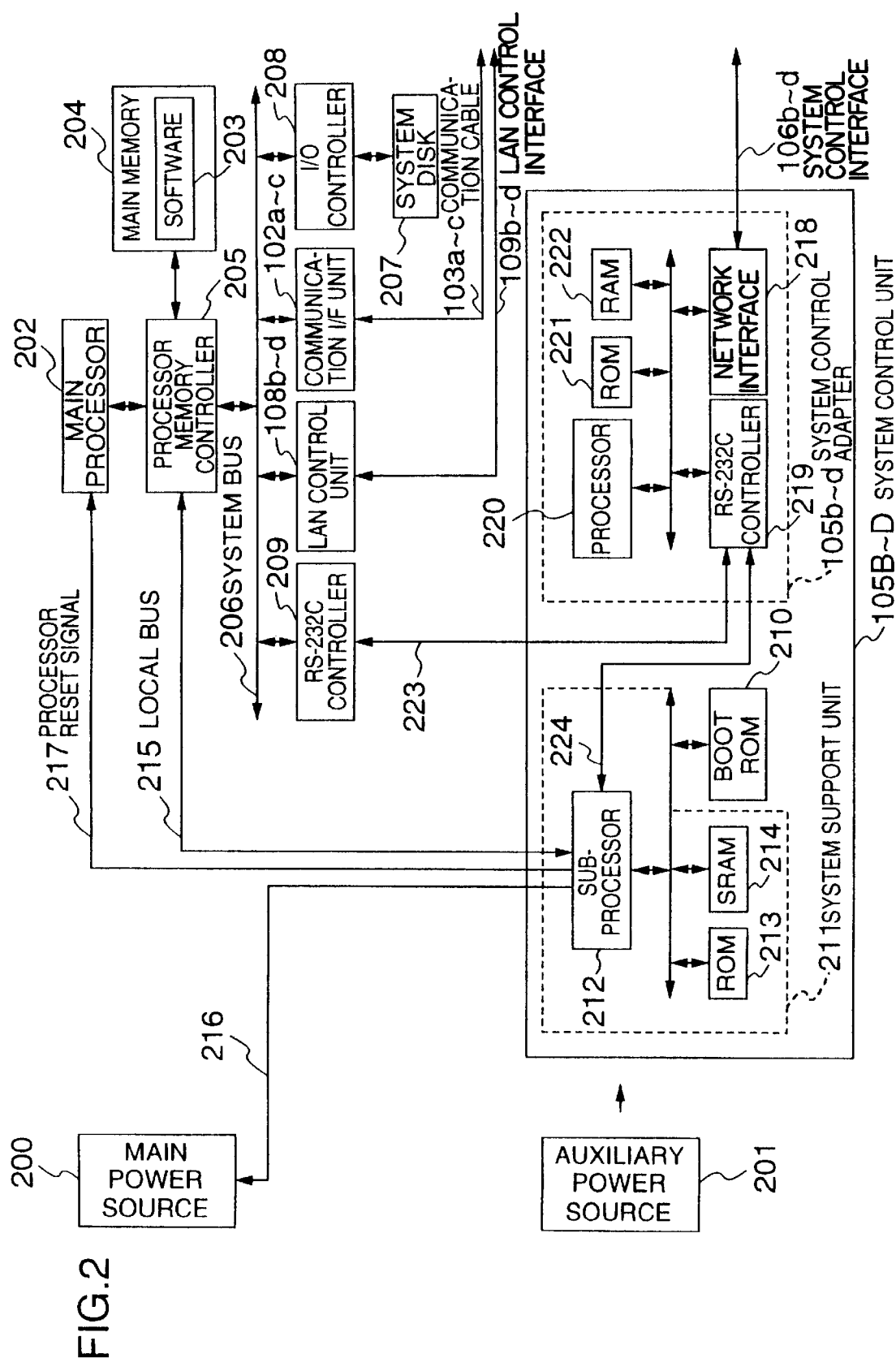
FIG. 2 shows the outline of the structure of a node constituting the parallel computer system to which the management system of the first embodiment is applied.

FIG. 2 is a block diagram showing the outline of the structure of each node 100a to 100c constituting the parallel computer system in the management system for the parallel computer system of this embodiment will be described.

In FIG. 2, reference numeral 200 represents a main power source, reference numeral 201 represents an auxiliary power source, reference numeral 202 represents a main processor, reference numeral 203 represents software, reference numeral 204 represents a main memory, reference numeral 205 represents a processor memory controller, reference numeral 206 represents a system bus, reference numeral 207 represents a system disk, reference numeral 208 represents an I/O controller, reference numeral 209 represents an RS-232C controller, reference numeral 210 represents a bootstrap ROM (Read Only Memory), reference numeral 211 represents a system support unit, reference numeral 212 represents a sub-processor, reference numeral 213 represents a ROM, reference numeral 214 represents an SRAM (Static Random Access Memory; battery-backed non-volatile memory), reference numeral 215 represents a local bus, reference numeral 216 represents a power on/off signal, reference numeral 217 represents a processor reset signal, reference numeral 218 represents a network interface, reference numeral 219 represents an RS-232C controller, reference numeral 220 represents a processor, reference numeral 221 represents a ROM, reference numeral 222 represents a RAM, reference numeral 223 represents data interface, and reference numeral 224 represents control interface including an RS-232C controller on the system support unit 211 side.

As shown in FIG. 2, the nodes 100a to 100c of the management system for the parallel computer system of this embodiment include the communication interface units 102a to 102c, system control units 105B to 105D, and LAN control units 108b to 108d, and each node further includes the main processor 202, system support unit 211 with the sub-processor 212, main power source 200, and auxiliary power source 201. The system control units 105B to 105D each include the system support unit 211, bootstrap ROM 210, and each system control adapter 105b to 105d.

Each node 100a to 100c of the management system for the parallel computer system of this embodiment includes: the software 203 of an operating system and network software to be executed by the main processor 202; the main memory 204 for storing the software 203; the processor memory controller 205 for the interface control between the main processor 202 and main memory 204; the system bus 206; the system disk 207; the I/O controller 208 for controlling the system disk 207; the RS-232C controller 209 for outputting a node message and for interactive operation with an operator via each system control adapter 105b to 105d; and the bootstrap ROM 210 storing a bootstrap program for system start-up.

In the management system for the parallel computer system of this embodiment, the system support unit 211 with the sub-processor 212 for the system control such as status management of the main processor 202 includes the ROM 213 storing a control program which runs on the sub-processor 212 and SRAM 214 storing hardware dependent information.

Each system control adapter 105b to 105d of each node 100a to 100c in the management system for the parallel computer system of this embodiment includes: the network interface 218 for controlling transmission/reception of an Ethernet packet to and from the control terminal 104; the RS-232C controller 219 for controlling transmission/reception of an RS-232C packet to and from the RS-232C controller 209 and sub-processor 212; the processor 220 for protocol conversion between Ethernet and RS-232C packets; the ROM 221 for storing a control program which runs on the processor 220; and the RAM 222 for storing node messages sent from the sub-processor 212 and RS-232C controller 209.

As shown in FIG. 2, each node 100a to 100c in the management system for the parallel computer system of this embodiment connects its system control adapter 105b to 105d to the main processor 202 via the RS-232C controller 219, data interface 223, RS-232C controller 209, system bus 206, and processor memory controller 205. Each node further connects its system control adapter 105b to 105d to the sub-processor 212 of the system support unit 211 via the RS-232C controller 219 and control interface 224, and to the main processor 202 via the local bus 215 and processor memory controller 205. The sub-processor 212 resets the main processor 202 by using the processor reset signal 217, and controls the main power source 200 by using the power on/off signal 216.

As shown in FIG. 2, in each node 100a to 100c in the management system for the parallel computer system of this embodiment, the system control adapter 105b to 105d is connected to the main processor 202 via the RS-232C controller 219, data interface 223, and RS-232C controller 209. By interconnecting the system control adapter 105b to 105d and the main processor 202 by serial interface such as RS-232C, the communication software becomes simple and communications between the system control adapter 105b to 105d and the main processor 202 becomes hard to be damaged easily even if any fault occurs in the main processor 202.

Each node 100a to 100c in the management system for the parallel computer system of this embodiment has a circuit portion powered by the main power source 200 and a circuit portion powered by the subsidiary power source 201.

The circuit portion powered by the main power source 200 in each node 100a to 100c includes: the main processor 202; the main memory 204 for storing the software 203; the processor memory controller 205 for processing the interface control between the main processor 202 and main memory 204; the bootstrap ROM 210 for storing the bootstrap program which is used for the system start-up of the main processor 202; and other circuit elements. These elements are connected via the system bus 206 to the communication interface units 102a to 102c, LAN control unit 108b to 108d, and the like and via the I/O controller 208 to the system disk 207.

The circuit portion powered by the subsidiary power source 201 in each node 100a to 100c includes: the system support unit 211 for the control of the main power source 200 and for the system control such as status management of the main processor 202; and the system control adapter 105b to 105d for the communication control to and from the control terminal 104.

The sub-processor 212 outputs the power on/off signal 216 in response to an instruction from the control terminal 104 to thereby control the main power source 200, and outputs the processor reset signal 217 to reset the main processor 202.

While the main processor 202 operates and the software 203 of the operating system and network software for controlling the main processor 202 are active, a node message of each node 100a to 100c is stored in RAM 222 via the data interface 223 and RS-232C controller 209. If the software 203 is not active, the sub-processor 212 generates a bootstrap message or the like which is stored in RAM 222 via the control interface 224.

In the management system for the parallel computer system of this embodiment, the processor 220 of each system control adapter 105b to 105d performs the following operations in addition to the above-described packet protocol conversion.

Specifically, the processor 220 analyzes an Ethernet packet from the control terminal 104 and performs an operation in accordance with the packet contents, and in response to an instruction from the control terminal 104, transmits the node message stored in RAM 222 to the control terminal 104. The sub-processor 212 analyzes the packet supplied via the control interface 224 and performs a control operation in accordance with the packet contents.

The outline of the structure of the control terminal 104 in the management system for the parallel computer system of this embodiment will be described with reference to FIGS. 3.

Figure 3:
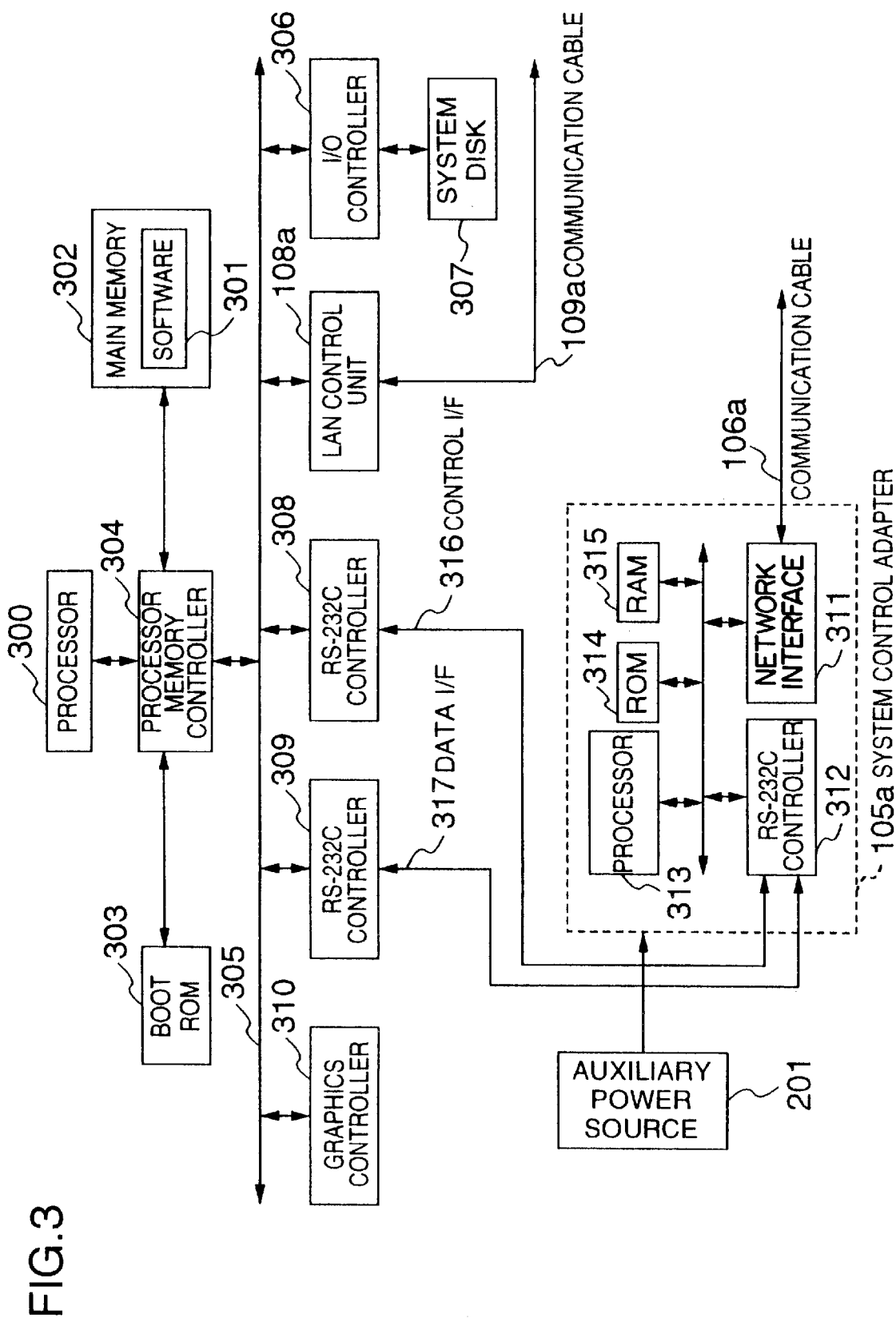
FIG. 3 shows the outline of the structure of a control terminal in the management system for the parallel computer system of the first embodiment.

FIG. 3 is a block diagram showing the outline of the structure of the control terminal 104 of the management system for the parallel computer system of this embodiment. In FIG. 3, reference numeral 300 represents a processor, reference numeral 301 represents software, reference numeral 302 represents a main memory, reference numeral 303 represents a bootstrap ROM, reference numeral 304 represents a processor memory controller, reference numeral 305 represents a system bus, reference numeral 306 represents an I/O controller, reference numeral 307 represents a system disk, reference numerals 308 and 309 represent a RS-232C controller, reference numeral 310 represents a graphics controller, reference numeral 311 represents a network interface, reference numeral 312 represents an RS-232C controller, reference numeral 313 represents a processor, reference numeral 314 represents a ROM, reference numeral 315 represents a RAM, reference numeral 316 represents control interface, and reference numeral 317 represents data interface.

As shown in FIG. 3, in the management system for the parallel computer system of this embodiment, the control terminal 104 includes: the processor 300 for the control of the whole control terminal 104; the main memory 302 for storing the software 301 of an operating system and network software of the control terminal 104; the bootstrap ROM 303 for storing a bootstrap program for the system start-up of the control terminal; and the processor memory controller 304 for the interface control among the processor 300, main memory 302, and bootstrap ROM 303.

In the management system for the parallel computer system of this embodiment, the control terminal 104 further includes: the system bus 305; the I/O controller 306 for controlling the system disk 307; the RS-232C controller 308 which is used when the system disk 307 or software 301 issues a system control command such as a power source control command to each node 100a to 100c; the RS-232C controller 309 for outputting a node message and for interactive operation with an operator via the system control adapter 105a; the graphics controller 310 for the control of man-machine interface such as a display terminal, a keyboard, and a mouse; and the system control adapter 105a.

The system control adapter 105a of the control terminal 104 in the management system for the parallel computer system of this embodiment includes: the network interface 311 for controlling transmission/reception of an Ethernet packet to and from each node 100a to 100c; the RS-232C controller 312 for controlling transmission/reception of an RS-232C packet between the RS-232C controllers 308 and 309; the processor 313 for protocol conversion between Ethernet and RS-232C packets; the ROM 314 for storing a control program which runs on the processor 313; and the RAM 315 for storing node messages sent from each node 100a to 100c.

As shown in FIG. 3, in the control terminal 104 of the management system for the parallel computer system of this embodiment, the processor 300 is connected via the processor memory controller 304 to the main memory 302, bootstrap ROM 303, and system bus 305, and the system bus 305 is connected to the system disk 307 via the I/O controller 306, and to the LAN control unit 108a, RS-232C controllers 308 and 309, and graphics controller 310.

As shown in FIG. 3, in the management system 104 of the management system for the parallel computer system of this embodiment, the RS-232C controller 312 of the system control adapter 105a is connected to the RS-232C controllers 308 and 309 via the control interface 316 and data interface 317.

In the management system for the parallel computer system of this embodiment, the system control interface is realized by interconnecting the system control adapters 105b to 105d of the nodes 100a to 100c and the system control adapter 105a of the control terminal 104 by Ethernet cables or the like.

The system control interface is active if the system control adapter 105a of the control terminal 104 is operable, if each auxiliary power source 201 of the node 100a to 100c is turned on, and if the sub-processor 212 and system control adapter 105b to 105d is operable, even if each main power source 200 of the node 100a to 100c is not turned on so that the main processor 202 is not operating and even if the software 203 of the operating system and network software for the control of the main processor 202 is not active.

In contrast, the system support interface is realized by interconnecting the LAN control unit 108a of the control terminal 104 and the LAN control units 108b to 108d of the nodes 100a to 100c by Ethernet cables or the like. This system support interface uses TCP/IP (Transmission Control Protocol/Internet Protocol). Therefore, this system support interface is usable only when both the software 203 and 301 of the operating systems and network software for the control of the control terminal 104 and nodes 100a to 100c are made active and network software supporting TCP/IP is active.

Figure 4:
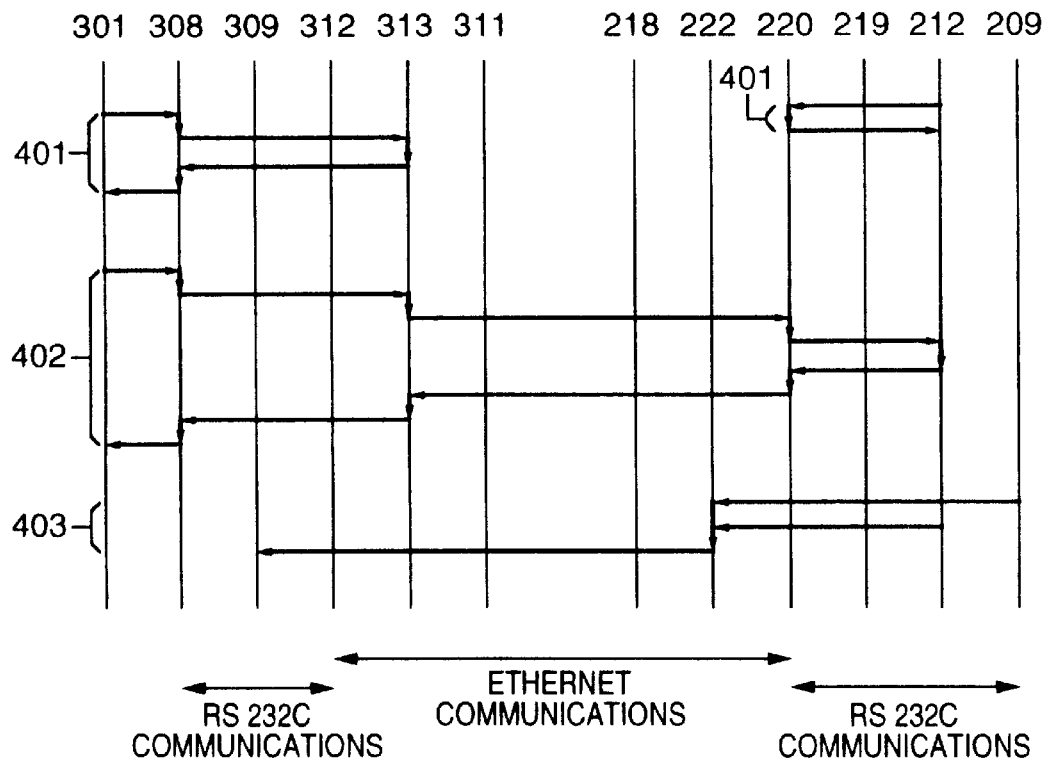
FIG. 4 shows an example of a communication sequence between the control terminal and each node in the management system for the parallel computer system of the first embodiment.

With reference to FIG. 4, the communication sequence between the nodes 100a to 100c and the control terminal 104 of the management system for the parallel computer system of this embodiment will be described.

FIG. 4 shows an example of a communication sequence between the nodes 100a to 100c and the control terminal 104 of the management system for the parallel computer system of this embodiment. In FIG. 4, reference numeral 401 represents an adapter control command and its response, reference numeral 402 represents a system control command and its response, and reference numeral 403 represents a node message.

As shown in FIG. 4, in the management system for the parallel computer system of this embodiment, communications are performed through transmission/reception of packets and node messages 403, the packets containing the adapter control command and its response 401 and system control command and its response 402.

The adapter control command and its response 401 are transmitted or received via the control interface 316 or 224 when the software 301 of the control terminal 104 performs communications with the system control adapter 105a of the control terminal 104 and when the sub-processor 212 performs communications with the system control adapters 105b to 105d.

The system control command and its response 402 are transmitted or received via the control interface 316 or 224 when the software 301 of the control terminal 104 performs communications with the sub-processors 212 of the nodes 100a to 100c.

The node message 403 is sent from the sub-processor 212 and stored in RAM 222 of each system control adapter 105b to 105d if the software 203 is not active, and is sent from the main processor 202 to the RS-232C controller 209 and stored in RAM 222 of each system control adapter 105b to 105d if the software 203 is active.

In response to a request from the management terminal 104, a node message stored in RAM 222 of each system control adapter 105b of the node 100a to 100c is transmitted via the system control adapter 105a of the control terminal 104 to the RS-232C controller 309 of the control terminal 104 and displayed on a graphics display or the like connected to the graphics controller 310 of the management terminal 104.

The packet format of the adapter control command and its response 401 used in the management system for the parallel computer system of this embodiment will be described.

Figure 5:
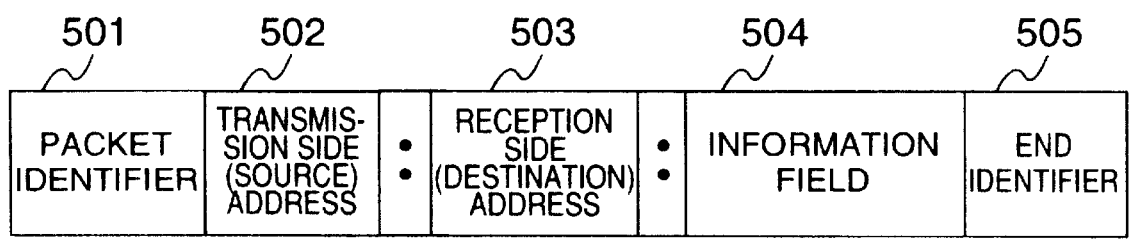
FIG. 5 shows the packet format of an adapter control command and its response used by the management system for the parallel computer system of the first embodiment.

FIG. 5 shows the packet format of the adapter control command and its response 401 used in the management system for the parallel computer system of this embodiment.

As shown in FIG. 5, the packet format of the adapter control command and its response 401 used in the management system for the parallel computer system of this embodiment is constituted by a packet identifier field 501, a transmission side address field 502, a reception side address field 503, an information field 504, and an end identifier field 505.

In the management system for the parallel computer system of this embodiment, the identifier field 501 stores a packet identifier, e.g., "A", representative of the adapter control command and its response, the transmission side address field 502 stores a transmission side address of the packet, and the reception side address field 503 stores a reception side address of the packet.

The information field 504 stores parameters different for each packet type, and the end identifier field 505 stores an identifier, e.g., "LF (line feed)", representative of the end of the packet.

The packet format of the system control command and its response 402 used in the management system for the parallel computer system of this embodiment will be described.

Figure 6:
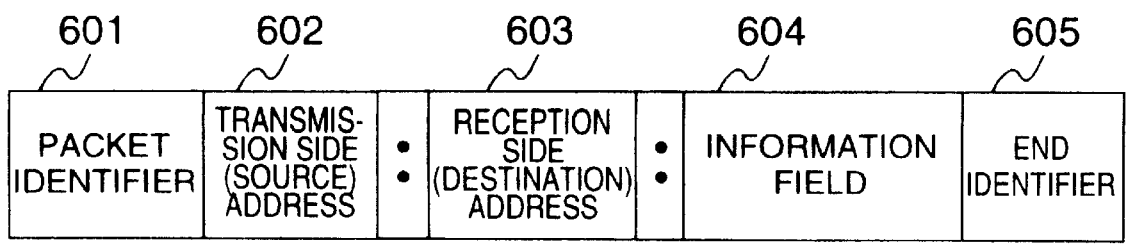
FIG. 6 shows the packet format of a system control command and its response used by the management system for the parallel computer system of the first embodiment.

FIG. 6 shows the packet format of the system control command and its response 402 used in the management system for the parallel computer system of this embodiment.

As shown in FIG. 6, the packet format of the system control command and its response 402 used in the management system for the parallel computer system of this embodiment is constituted by a packet identifier field 601, a transmission side address field 602, a reception side address field 603, an information field 604, and an end identifier field 605.

In the management system for the parallel computer system of this embodiment, the identifier field 601 stores a packet identifier, e.g., "d", representative of the system control command and its response, the transmission side address field 602 stores a transmission side address of the packet, and the reception side address field 603 stores a reception side address of the packet.

The information field 604 stores parameters different for each packet type, and the end identifier field 605 stores an identifier, e.g., "LF", representative of the end of the packet.

In the management system for the parallel computer system of this embodiment, if a packet transmitted from the control terminal 104 stores "0xffffffff" in hexadecimal in its reception side address field 603, this packet is a broadcast packet and transmitted to all the nodes 100a to 100c.

In the description of the management system for the parallel computer system of this embodiment, a numeral added with "0x" is a hexadecimal number.

The mode transition between a packet mode and a non-packet mode of the system control adapter 105a to 105d of the management system for the parallel computer system of this embodiment will be described.

Figure 7:
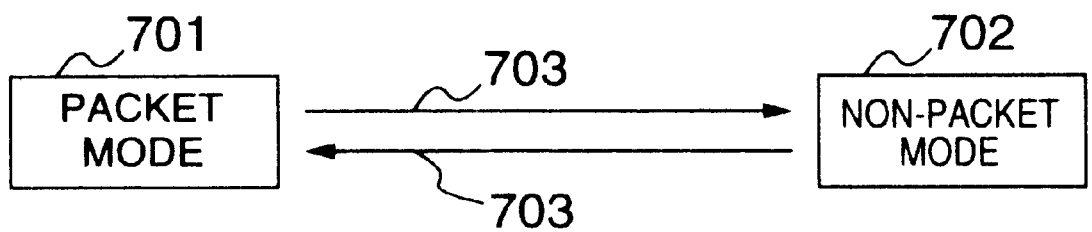
FIG. 7 is a mode transition diagram of a system control adapter of the management system for the parallel computer system of the first embodiment.

FIG. 7 is a mode transition diagram of the system control adapter of the management system for the parallel computer system of this embodiment.

As shown in FIG. 7, the system control adapter of the management system for the parallel computer system of this embodiment has a packet mode 701 for transmission/reception of a fixed length packet and a non-packet mode 702 for transmission/reception of a variable length packet. The mode transition between the packet mode 701 and non-packet mode 702 is made by executing a "SET-MODE" command 703 from the sub-processor 212 which is an adapter control command.

As described above, the operation mode of each system control adapter 105a to 105d of the management system for the parallel computer system of this embodiment has two modes, the packet mode 701 and non-packet mode 702. The packet mode 701 is a mode which is set for communications between the control terminal 104 and a plurality of nodes 100a to 100c, and the non-packet mode 702 is a mode set for connection type communications with a particular node wherein a node message 403 from the particular node is displayed at the control terminal 104.

In the management system for the parallel computer system of this embodiment, it is assumed that the system control adapters 105a to 105d of the control terminal 104 and nodes 100a to 100c operate in the packet mode 701 when the auxiliary power sources 201 are turned on.

The connection state transition in the non-packet mode 702 of each system control adapter 105a to 105d of the management system for the parallel computer system of this embodiment will be described.

Figure 8:
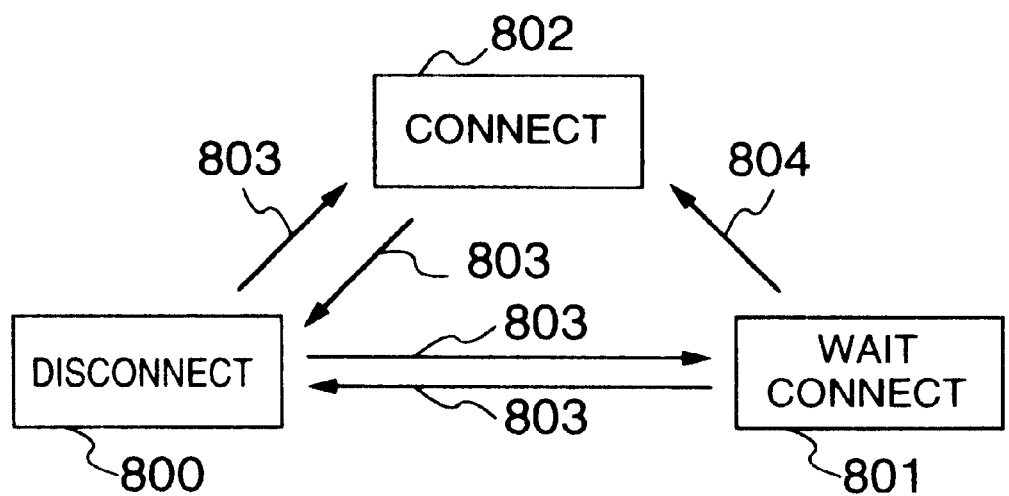
FIG. 8 is a connection state transition diagram in a non-packet mode of the system control adapter of the management system for the parallel computer system of the first embodiment.

FIG. 8 shows the connection state transition in the non-packet mode 702 of each system control adapter 105a to 105d of the management system for the parallel computer system of this embodiment.

As shown in FIG. 8, the connection state in the non-packet mode 702 of each system control adapter 105a to 105d of the management system for the parallel computer system of this embodiment includes: a disconnection state 800 wherein the partner system control adapter is not connected and the node message 403 is not stored in RAM 222; a wait connection state 801 wherein although the partner system control adapter is connected, the node message 403 is stored in RAM 222; and a connection state wherein the partner system control adapter is connected. The transition of the connection state is effected by a "SET-CONNECT" command 803 or a calling control 804 from the system control adapter.

As shown in FIG. 8, in the management system for the parallel computer system of this embodiment, during the non-packet mode 702, the three connection states are preserved including the disconnection state 800, wait connection state 801, and connection state 802. In the disconnection state 800, communications between system control adapters are impossible, and in the wait connection state 801, although communications with the partner system control adapter are impossible, the node message 403 is sequentially stored in RAM 222.

If the system control adapters under the communications are in the connection state 802, the connection type communications are possible in the non-packet mode 702.

The connection state transition is effected upon issuance of the "SET-CONNECT" command 803. Upon a calling control 804 from the partner system control adapter, a transition is made from the wait connection state 801 to the connection state 802.

A list of adapter control commands and their responses 401 used by the management system for the parallel computer system of this embodiment is shown in Table 1. In Table 1, an information part is information stored in the information field 504, a numeral in the information part at the 0th byte is the number representative of the packet type.

puter system of this embodiment is shown in Table 2. In Table 2, an information part is information stored in the information field 604, a numeral in the information part at

TABLE 1

| PACKET NO. | PACKET TYPE | OPERATION | INFORMATION PART | | |
|---|---|---|---|---|---|
| | | | 0-TH BYTE | 1ST BYTE | 2ND AND FOLLOWING BYTES |
| 1 | SET-ADDRESS COMMAND | INITIALIZING OF SYSTEM CONTROL ADAPTER 105 (SETTING LOGICAL ADDRESS, ETC) | 1 | NONE | NONE |
| 2 | SET-ADDRESS RESPONSE | RESPONSE OF INITIALIZATION RESULT | 1 | COMPLETION CODE | STATUS INFORMATION |
| 3 | SET-MODE COMMAND | SETTING OF OPERATION MODE OF SYSTEM CONTROL ADAPTER 105 | 3 | OPERATION MODE | NONE |
| 4 | SET-MODE RESPONSE | RESPONSE OF OPERATION MODE SETTING RESULT | 3 | COMPLETION CODE | NONE |
| 5 | SET-CONNECT COMMAND | CONNECTION CONTROL IN NON-PACKET MODE 702 | 5 | CONNECTION INSTRUCTION | NONE |
| 6 | SET-CONNECT RESPONSE | RESPONSE OF CONNECTION CONTROL RESULT | 5 | COMPLETION CODE | DETAILED INFORMATION |
| 7 | REPORT-CONNECT INDICATION | CONNECTION STATE CHANGE NOTICE (SEND CONNECTION REQUEST FROM PARTNER SYSTEM CONTROL ADAPTER 105 TO SUB-PROCESSOR 212 AT RECEIVED SIDE) | A | CONNECTION CHANGE STATE | NONE |
| 8 | REPORT-CONNECT RESPONSE | RESPONSE OF REPORT-CONNECT RECEPTION | A | NONE | NONE |

A list of adapter control commands and their responses 402 used by the management system for the parallel comthe 0th byte is the number representative of the packet type.

TABLE 2

| PACKET NO. | PACKET TYPE | OPERATION | INFORMATION PART | | |
|---|---|---|---|---|---|
| | | | 0-TH BYTE | 1ST BYTE | 2ND AND FOLLOWING BYTES |
| 1 | P-ON COMMAND | TURN ON POWER AT NODE 100 | 1 | NONE | NONE |
| 2 | P-ON RESPONSE | RESPONSE OF POWER TURN-ON | 1 | COMPLETION CODE | NONE |
| 3 | P-OFF COMMAND | TURN OFF POWER AT NODE 100 | 2 | NONE | NONE |
| 4 | P-OFF RESPONSE | RESPONSE OF POWER TURN-OFF | 2 | COMPLETION CODE | NONE |
| 5 | PROC-RESET COMMAND | RESET MAIN PROCESSOR 202 | 3 | NONE | NONE |
| 6 | PROC-RESET RESPONSE | RESPONSE OF RESET RESULT | 3 | COMPLETION CODE | NONE |
| 7 | STATUS-READ COMMAND | READ STATUS CODE OF NODE 100 | 4 | NONE | NONE |
| 8 | STATUS-READ RESPONSE | RESPONSE OF STATUS CODE READ | 4 | COMPLETION CODE | STATUS INFORMATION |
| 9 | MS-READ COMMAND | READ CONTENTS OF MAIN MEMORY 204 | 5 | START ADDRESS: READ LENGTH | |
| 10 | MS-READ RESPONSE | RESPONSE OF READ MEMORY VALUE | 5 | COMPLETION CODE | READ VALUE |
| 11 | MS-WRITE COMMAND | WRITE INTO MAIN MEMORY 204 | 6 | START ADDRESS: WRITE DATA | |
| 12 | MS-WRITE RESPONSE | RESPONSE OF VALUE AFTER WRITING INTO MEMORY 204 | 6 | COMPLETION CODE | VALUE AFTER WRITING |
| 13 | REG-READ COMMAND | READ CONTENTS OF REGISTER | 7 | REGISTER ADDRESS: READ LENGTH | |
| 14 | REG-READ RESPONSE | RESPONSE OF READ REGISTER VALUE | 7 | COMPLETION CODE | READ VALUE |
| 15 | REG-WRITE COMMAND | WRITE INTO REGISTER | 8 | REGISTER ADDRESS: WRITE DATA | |

TABLE 2-continued

| PACKET NO. | PACKET TYPE | OPERATION | INFORMATION PART | | |
| --- | --- | --- | --- | --- | --- |
| | | | 0-TH BYTE | 1ST BYTE | 2ND AND FOLLOWING BYTES |
| 16 | REG-WRITE RESPONSE | RESPONSE OF VALUE AFTER WRITING INTO REGISTER | 8 | COMPLETION CODE | VALUE AFTER WRITING |

The procedure to be executed by the processor 220 of each system control adapter 105b to 105d of the node 100a to 100c in the management system for the parallel computer system of this embodiment will be described.

Figure 9:
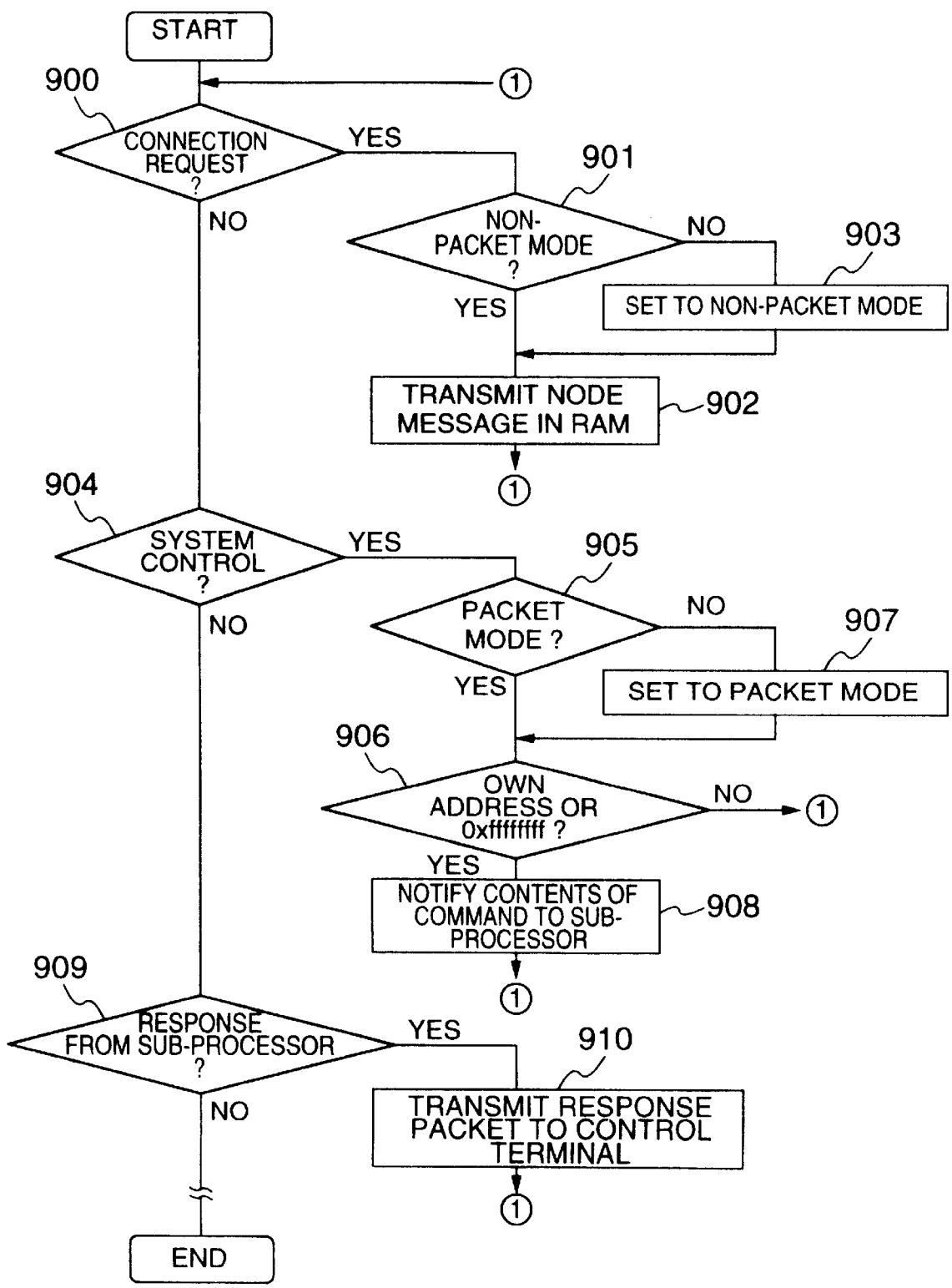
FIG. 9 is a flow chart illustrating part of a procedure to be executed by a processor of the system control adapter of the management system for the parallel computer system of the first embodiment.

FIG. 9 is a flow chart illustrating part of the procedure to be executed by the processor 220 of each system control adapter 105b to 105d of the node 100a to 100c in the management system for the parallel computer system of this embodiment.

As shown in FIG. 9, the processor 220 of each system control adapter 105b to 105d of the node 100a to 100c in the management system for the parallel computer system of this embodiment checks at step 900 whether there is a connection request from the control terminal 104 by the "SET-CONNECT" command or calling control.

If there is a connection request from the control terminal 104 by the "SET-CONNECT" command or calling control, the flow advances to step 901 whereat it is checked whether the system control adapter 105b to 105d of the node 100a to 100c is in the non-packet mode 702.

If it is judged at step 901 that the system control adapter 105b to 105d of the node 100a to 100c is in the non-packet mode 702, the flow advances to step 902, whereas if it is judged at step 901 that the system control adapter 105b to 105d of the node 100a to 100c is not in the non-packet mode 702, the flow advances to step 903 whereat the system control adapter 105b to 105d of the node 100a to 100c is set to the non-packet node 702 by sending the system control command "SET-MODE" from the sub-processor 212, and thereafter the flow advances to step 902.

At step 902, the node message 403 stored in RAM 222 of the system control adapter 105b to 105d of the node 100a to 100c is transmitted to the control terminal 104 via the system control interface, and the flow returns to step 900.

If it is judged at step 900 that there is no connection request from the control terminal 104 by the "SET-CONNECT" command or calling control, the flow advances to step 904 whereat it is checked whether there is a system control request from the control terminal 104 by the system control command.

If it is judged at step 904 that there is a system control request from the control terminal 104 by the system control command, the flow advances to step 905 whereat it is checked whether the system control adapter 105b to 105d of the node 100a to 100c is in the packet mode 701.

If it is judged at step 904 that there is no system control request from the control terminal 104 by the system control command, the flow advances to step 909.

If it is judged at step 905 that the system control adapter 105b to 105d of the node 100a to 100c is in the packet mode 701, the flow advances to step 906, whereas if it is judged at step 905 that the system control adapter 105b to 105d of the node 100a to 100c is not in the packet mode 701, the flow advances to step 907 whereat the system control adapter 105b to 105d is set to the packet mode 701 by sending the system control command "SET-MODE" from the sub-processor 212, and thereafter the flow advances to step 906.

At step 906, the reception side address field 603 of the system control command is checked. If the reception side address field 603 of the system control command stores its own logical address or "0xffffffff", the flow advances to step 908 whereat the contents of the system control command are notified to the sub-processor 212 and thereafter the flow returns to step 900.

If it is judged at step 906 that the reception side address field 603 of the system control command does not store its own logical address or "0xffffffff", the flow returns to step 900.

It is checked at step 909 whether the result of processing by the sub-processor 212 of the node 100a to 100c has been returned. If the result of processing by the sub-processor 212 has been returned, the flow advances to step 910 whereat the response packet for the system control command is transmitted to the management terminal 104 and thereafter the flow returns to step 900.

The procedure to be executed by the sub-processor 212 of the system support unit 211 of the node 100a to 100c of the management system for the parallel computer system of this embodiment will be described.

Figure 10:
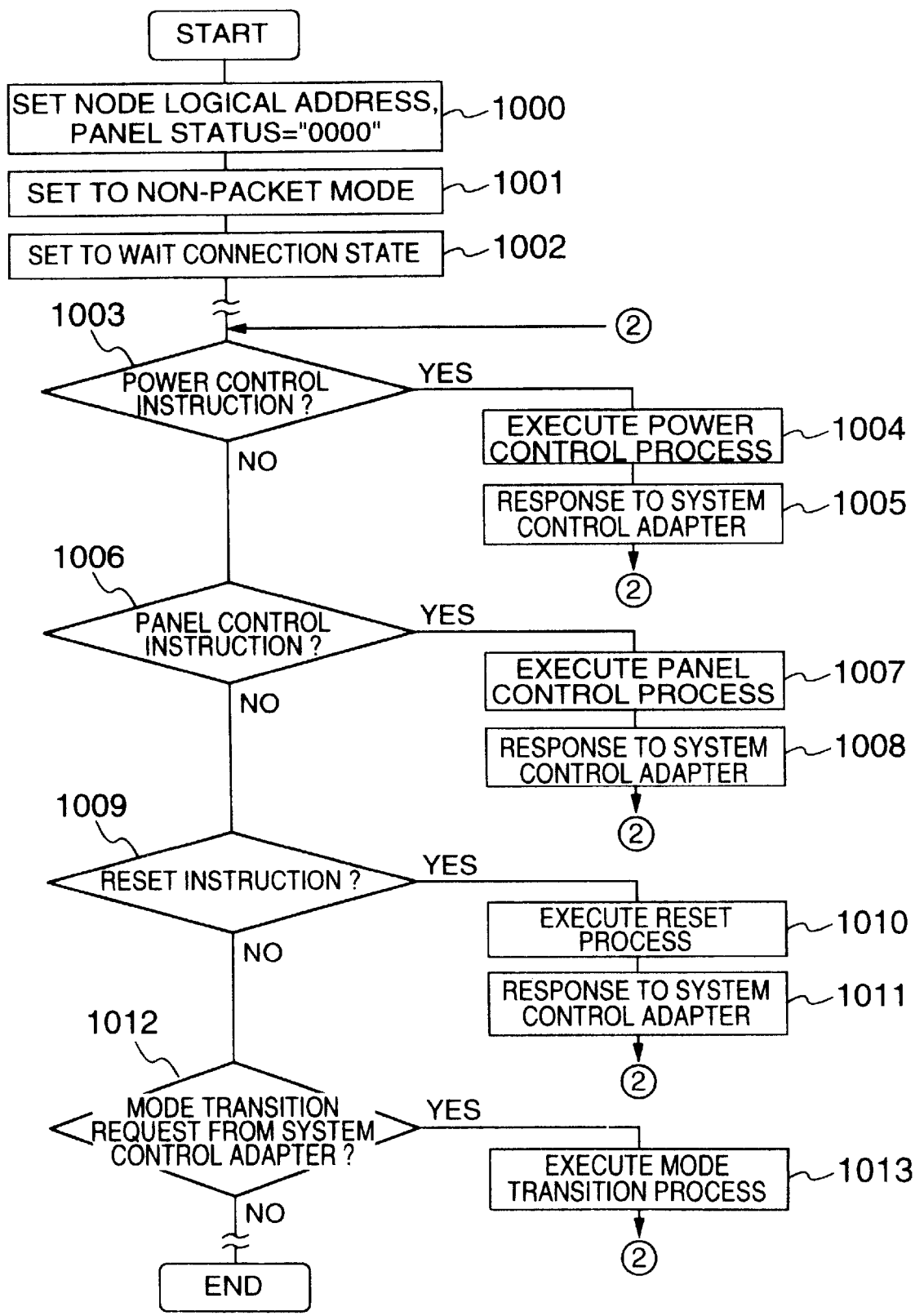
FIG. 10 is a flow chart illustrating part of a procedure to be executed by a sub-processor of a system support unit of the management system for the parallel computer system of the first embodiment.

FIG. 10 is a flow chart illustrating part of the procedure to be executed by the sub-processor 220 of each system support unit 211 of the node 100a to 100c in the management system for the parallel computer system of this embodiment.

As shown in FIG. 10, the sub-processor 220 of each system control adapter 105b to 105d of the node 100a to 100c in the management system for the parallel computer system of this embodiment sets, at step 1000 upon turn-on of the auxiliary power source 201, the logical address of the node 100a to 100c and "0000" to a panel status management area of SRAM 214 which stores a status code to be displayed on a panel of the node 100a to 100c.

Next at step 1001, the system control adapter 105b to 105d of the node 100a to 100c is set to the non-packet mode 702, and at step 1002 the connection state of the system control adapter 105b to 105d of the node 100a to 100c is set to the wait connection state 801.

The reason why the mode of the system control adapter 105b to 105d of the node 100a to 100c is set to the non-packet mode 702 and the connection state of the system control adapter 105b to 105d of the node 100a to 100c is set to the wait connection state 801, is to store the node message of the node 100a to 100c in RAM 222 of the system control adapter 105b to 105d and to send the node message stored in RAM 222 of the system control adapter 105b to 105d to the control terminal 104 when there is a connection request by the calling control 804 by the system control adapter 105a of the management system 104.

Furthermore, with the above setting, the node message stored in RAM 222 of the system control adapter 105b to 105d can be read even if the software 203 of the node 100a to 100c is not active.

When the system control command is sent from the system control adapter 105a of the management terminal 104 to the system control adapter 105b to 105d of the node 100a to 100c, the system control command is sent to the sub-processor 212 of the node 100a to 100c and the sub-processor 212 executes the system control command.

It is checked at step 1003 whether the system control adapter 105a of the control terminal 104 has sent a system control command of a power control instruction for turning on or off the main power source 200 of the node 100a to 100c via the system control adapter 105b to 105d of the node 100a to 100c.

If it is judged at step 1003 that there is a power control instruction from the control terminal 104, then at step 1004 a power control process is executed to turn on or off the main power source 200 of the node 100a to 100c. At step 1005, the result of the execution of the power control process is notified to the system control adapter 105b to 105d of the node 100a to 100c, and thereafter the flow returns to step 1003.

If it is judged at step 1003 that there is no power control instruction from the control terminal 104, it is then checked at step 1006 whether the system control adapter 105a of the control terminal 104 has sent via the system control adapter 105b to 105d of the node 100a to 100c a system control command of a panel control instruction for controlling a panel at the node 100a to 100c.

If it is judged at step 1006 that there is a panel control instruction from the control terminal 104, the flow advances to step 1007 whereat a panel control process is executed and at step 1008 the result of the execution of the panel control process is notified to the system control adapter 105b to 105d of the node 100a to 100c, and thereafter the flow returns to step 1003.

If it is judged at step 1006 that there is no panel control instruction from the control terminal 104, it is then checked at step 1009 whether the system control adapter 105a of the control terminal 104 has sent via the system control adapter 105b to 105d of the node 100a to 100c a system control command of a reset instruction for resetting the main processor 202 of the node 100a to 100c.

If it is judged at step 1009 that there is a reset instruction from the control terminal 104, the flow advances to step 1010 to execute a reset process for the main processor 202 of the node 100a to 100c and at step 1011 the result of the execution of the reset process is notified to the system control adapter 105b to 105d of the node 100a to 100c, and thereafter the flow returns to step 1003.

If it is judged at step 1012 that there is a mode transition request from the system control adapter 105b to 105d, the flow advances to step 1013 whereat the adapter control command "SET-MODE" is executed to change the operation mode of the system control adapter 105b to 105d, and thereafter the flow returns to step 1003.

2nd Embodiment

The second embodiment of a management system for a parallel computer system will be described wherein the control terminal 104 instructs a plurality of nodes 100a to 100d to turn on the main power sources 200 and monitors the status codes of the nodes 100a to 100d to monitor the operation starts of the main processors 202 of the nodes 100a to 100d.

Figure 11:
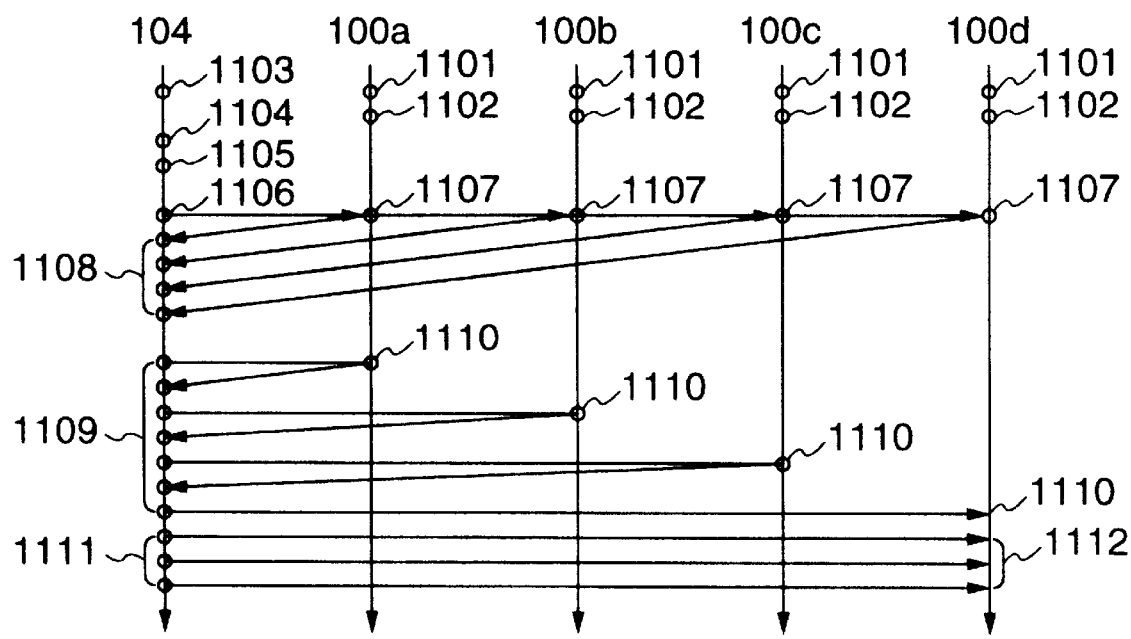
FIG. 11 shows an example of a sequence of turning on a main power source of each node to be instructed by a control terminal of a management system for a parallel computer system according to a second embodiment.

FIG. 11 shows an example of a power turn-on sequence of instructing a turn-on of the main power sources 200 from the control terminal 104 to the nodes 100a to 100d in the management system for the parallel computer system of the second embodiment.

In FIG. 11, reference numeral 100d represents a node, and reference numerals 1101 to 1112 represent a sequence of a power turn-on at each sequence stage.

As shown in FIG. 11, in the power-on sequence of instructing a turn-on of the main power sources 200 from the control terminal 104 to the nodes 100a to 100d in the management system for the parallel computer system of this embodiment, the auxiliary power sources 201 of the nodes 100a to 100d are turned on at a sequence stage 1101.

As the auxiliary power sources 201 of the nodes 100a to 100d are turned on, at a sequence stage 1102 each sub-processor 212 of the nodes 100a to 100d initializes the system support unit 211, initializes the system control adapters 105b to 105d by using the adapter control command "SET-ADDRESS", and sets logical addresses necessary for the management of the nodes 100a to 100d by the control terminal 104.

Examples of the formats of the "SET-ADDRESS" command for setting a logical address "0x00000001" and its response are as follows.

<Command>:
A 0x00000001: (the reception side address field 503 is omitted): 0x01 LF
<Response>:
A 0x00000001:0x00000001:0x01 (status information) LF As the power source of the control terminal 104 is turned on at a sequence stage 1103, the bootstrap program stored in the bootstrap ROM 303 of the control terminal 104 performs a system start-up process for the control terminal 104.

As the system start-up process for the control terminal 104 is completed at a sequence stage 1104, the software 301 of the control terminal 104 sets the logical address of the management terminal 104 by the "SET-ADDRESS" command at a sequence stage 1105.

After the logical addresses of the control terminal 104 and the nodes 100a to 100d are set, the software 301 of the control terminal 104 reads at a sequence stage 1106 the status codes representative of the status conditions of the nodes 100a to 100d by using the broadcast packet of the system control command.

The status code is stored in the panel status management area of SRAM 214 of each node 100a to 100d. For example, as the auxiliary power sources 201 of the nodes 100a to 100d are turned on, a predetermined status code is written in the panel status management area, and the status code can be read by the sub-processor 212 (in the management system for the parallel computer system of this embodiment, it is assumed that a code "0000" is read).

In this example, the control terminal 104 broadcasts a "STATUS-READ" command to all the nodes 100a to 100d.

Examples of the formats of the "STATUS-READ" command broadcast by the control terminal 104 having the logical address "0xa0000000" and its response from the node having the logical address "0x00000005" are as follows.

<Command>:
d 0xa0000000:0xffffffff:0x4 LF
<Response>:
d 0x00000005:0xa0000000:0x04 0000 LF At a sequence stage 1107, the "STATUS-READ" command is received by the nodes 100a to 100d. After each sub-processor 212 reads the status code "0000", the response in the above-described format is returned from the nodes 100a to 100d to the control terminal 104 at a sequence stage 1108.

In this case, the software 301 of the control terminal 104 compares the logical address of each node which returned a normal response with the configuration information of the nodes 100a to 100d constituting the parallel computer system stored in advance in the software 301 of the control terminal 104 or stored in a specific file. Thereafter, a retry process is performed by sending again the "STATUS-READ" command at a preset time interval to the node which did not return a normal response.

At a sequence stage 1109, the software 301 of the control terminal 104 turns on, by using a "P-ON" command, the main power source 200 of the node which returned the normal response packet at the sequence stage 1108.

Examples of the formats of the "P-ON" command from the control terminal 104 having a logical address of, for example, "0x00000005" and its response to the node having a logical address of, for example, "0x00000005" are as follows.

<Command>:
d 0xa0000000:0x00000005:0x01 LF
<Response>:
d 0x00000005:0xa0000000:0x01 (completion code) LF In this case, under the control of the software 301 of the control terminal 104, the "P-ON" command is transmitted not at the same time but at a preset time interval to the nodes 100a to 100d. Therefore, rush current to the power source facility for supplying power to the whole parallel computer system can be suppressed small.

Each sub-processor 212 of the nodes 100a to 100d which received the "P-ON" command at a sequence stage 1110 outputs the power turn-on signal 216 to turn on the main power source 200, and thereafter returns the response relative to the "P-ON" command to the control terminal 104.

As the main power source 200 of each node 100a to 100d is turned on, the main processor 202 executes the bootstrap program stored in the bootstrap ROM 210 to start the system start-up process.

Status codes sequentially incremented by the bootstrap program during the system start-up process include the following status codes shown in Table 3. In the management system for the parallel computer system of this embodiment, each status code is represented by a hexadecimal number.

TABLE 3

| STATUS CODE | MEANING |
| --- | --- |
| 1000 | DURING INITIALIZATION OF HARDWARE |
| 1FFF | HARDWARE FAULT |
| 2000 | DURING LOADING PROGRAM |
| 2FFF | PROGRAM LOAD ERROR |
| 3000 | END OF HARDWARE BOOTSTRAP |
| A000 | DURING INITIALIZATION OF SOFTWARE |
| F000 | DURING OPERATION OF APPLICATION SOFTWARE |

The bootstrap program for the main processor 202 of each node 100a to 100d writes a status code in the panel status management area of SRAM 214 of the node 100a to 100d, and as the system start-up process progresses, the status code is renewed periodically.

The panel status management area is also accessible by the sub-processor 212 of the node 100a to 100d. For example, the status code can be notified to an operator by displaying it on a display device such as a panel of the node 100a to 100d.

The software 301 of the control terminal 104 periodically reads the status code of the node 100a to 100d by using the "STATUS-READ" command to monitor the state of the node 100a to 100d.

At the sequence stage 1110, the software 301 of the control terminal 104 monitors at the predetermined time interval the period from transmission of the system command to reception of its response. As shown in FIG. 11, for the node 100d which has any trouble and did not return the normal response in a predetermined time duration, the retry process is performed by sending again the system control command at the preset time interval at a sequence stage 1111.

As shown in FIG. 11, in the management system for the parallel computer system of this embodiment, if the node 100d does not return the normal response after the retry process is performed a predetermined number of times (in this embodiment, three times), the software 301 of the control terminal 104 recognizes at a sequence 1112 that the node 100d has some fault.

As described above, if the normal response to a system control command is not received in the preset time duration, the software 301 of the control terminal 104 transmits again the same system control command at the preset time interval. Therefore, even if the software 201 of the node 100a to 100d is not active, it is possible to conduct the management whether the system start-up process for the main processor 202 of the node 100a to 100d has been normally completed.

As described so far, according to the management system for the parallel computer system of this embodiment, in response to an instruction from the control terminal 104, the main power sources 200 of a plurality of nodes 100a to 100d are turned on or off. Accordingly, the control terminal 104 can collectively or singularly turn on or off the main power source of each of the plurality of nodes 100a to 100d constituting the parallel computer system.

Further, according to the management system for the parallel computer system of this embodiment, an instruction of turning on the main power sources 200 of the nodes 100a to 100d is not made at the same time but at the preset time interval. Therefore, rush current to the power source facility for supplying power to the whole parallel computer system can be suppressed small.

Furthermore, according to the management system for the parallel computer system of this embodiment, in response to an instruction from the control terminal 104, the status code of the node 100a to 100d is read. Therefore, the control terminal 104 can collectively monitor the states of a plurality of nodes 100a to 100d.

Still further, according to the management system for the parallel computer system of this embodiment, it is checked whether the normal response to a system control command sent from the control terminal 104 has been received in the predetermined time duration. Therefore, the control terminal 104 can monitor whether a plurality of nodes 100a to 100d constituting the parallel computer system operate in a normal state.

3rd Embodiment

The third embodiment of a management system for a parallel computer system will be described with reference to FIG. 12 wherein the node message 403 from a node 100a is displayed at the control terminal 104 and maintenance and management are carried out if necessary.

Figure 12:
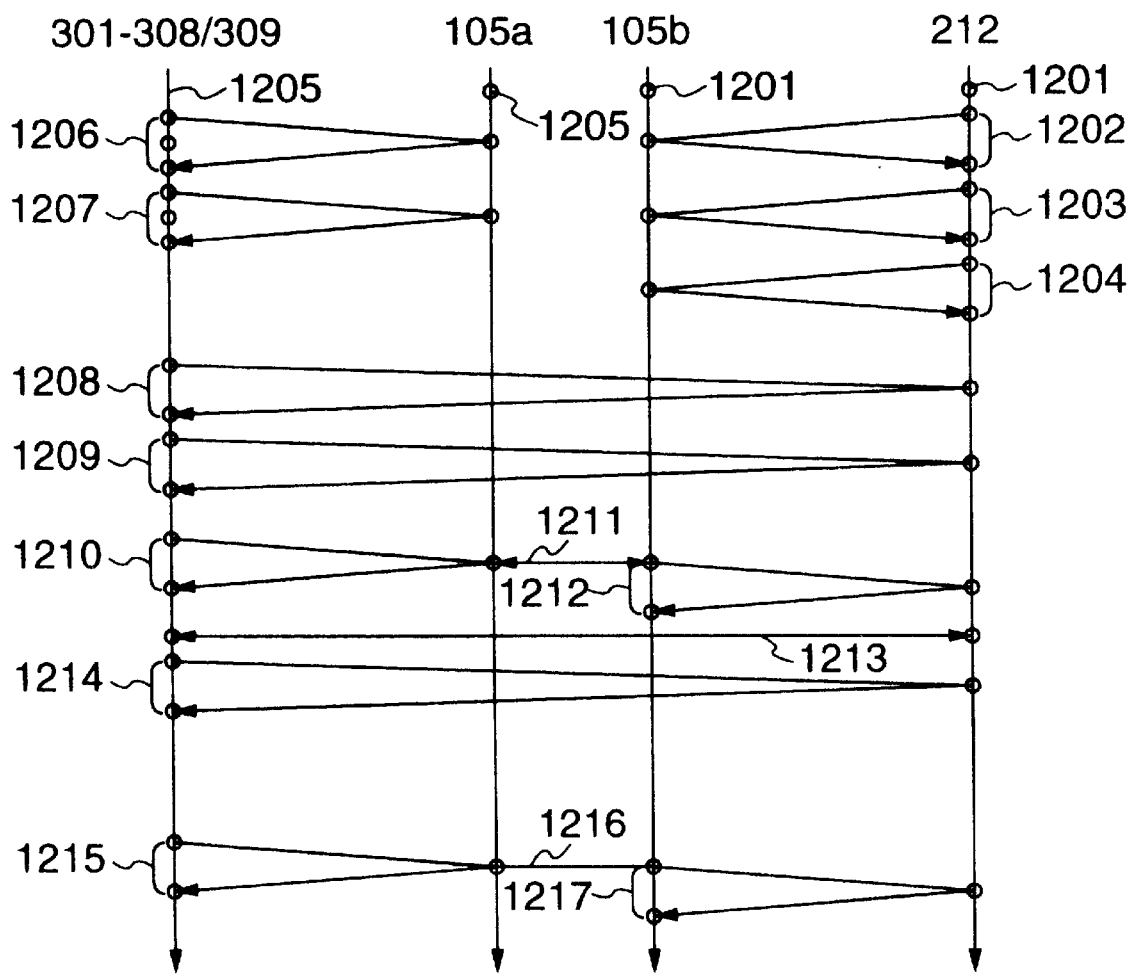
FIG. 12 shows an example of a sequence of displaying a node message from each node at a control terminal of a management system for a parallel computer system according to a third embodiment.

FIG. 12 shows an example of a sequence of displaying the node message 403 from the node 100a at the control terminal 104 of the management system for the parallel computer system of the third embodiment. In FIG. 12, reference numerals 1201 to 1207 represent sequence stages for displaying the node message 403.

As shown in FIG. 12, in the sequence of displaying the node message 403 from the node 100a at the control terminal 104 of the management system for the parallel computer system of this embodiment, at the sequence stage 1201, the auxiliary power source 201 of the node 100a is turned on in advance so that the system control adapter 105b (whose operation mode is the packet mode 701), sub-processor 212, and processor 220 are operable.

The sub-processor 212 of the node 100a whose auxiliary power source 201 is on sets the logical address of the node 100a by using the "SET-ADDRESS" command at the sequence stage 1202.

Next, at the sequence stage 1203, the sub-processor 212 of the node 100a sets the operation mode of the system control adapter 105b to the non-packet mode 702 (disconnection state 800) by using the "SET-MODE" command.

At the sequence stage 1204, the sub-processor 212 of the node 100a sets the connection state to the wait connection state 801 in the non-packet mode 702 by using the "SET-CONNECT" command.

As the power of the control terminal 104 is turned on, the control terminal 104 starts the system start-up process at the sequence stage 1205.

As the system start-up process of the control terminal 104 is completed, the software 301 of the control terminal 104 sets at the sequence stage 1206, similar to the node 100a, the logical address of the control terminal 104 by using the "SET-ADDRESS" command, and at the sequence stage 1207, sets the operation mode to the disconnection state 800 in the non-packet mode 702 by using the "SET-MODE" command.

At the sequence stage 1208, the software 301 of the control terminal 104 reads the status code of the node 100a by using the "STATUS-READ" command, and if the status code "0000" is read, at the sequence stage 1209, transmits the "P-ON" command to the node 100a to instruct to turn on the main power source 200 of the node 100a.

At the node 100a which turned on the main power source 200 upon reception of the "P-ON" command from the control terminal 104, the main processor 202 executes the bootstrap program stored in the bootstrap ROM 210 to execute the system start-up process for the node 100a.

During this system start-up process, the node message 403 output by the bootstrap program at the node 100a is stored via the sub-processor 212 into RAM 222 of the system control adapter 105b of the node 100a.

At the sequence stage 1210, the software 301 of the control terminal 104 sets the connection state of the system control adapter 105a of the control terminal 104 to the connection state 802 by using the "SET-CONNECT" command to thereby start monitoring the node message stored in RAM 222 of the system control adapter 105b of the node 100a during the system start-up process by the main processor 202 of the node 100a.

Upon reception of the "SET-CONNECT" command, the system control adapter 105a of the control terminal 104 issues at the sequence stage 1211 the calling control 804 to the system control adapter 105b of the node 105b. Upon reception of this calling control 804, the connection state of the system control adapter 105b of the node 100a is changed from the wait connection state 801 to the connection state 802.

At the same time, the system control adapter 105b of the node 100a issues at the sequence stage 1212 a "REPORT-CONNECT" command to the sub-processor 212 of the node 100a to notify the connection request from the control terminal 104.

Examples of the formats of the "REPORT-CONNECT" command and its response are as follows. The transmission/reception addresses are omitted in the formats in these examples and those described previously.

<Command>:
A::0xA (connection change state) LF
<Response>:
A::0xA LF

When the system control adapter 105b of the node 100a receives the connection request by the calling control 804, the node message 403 of the node 100a stored in RAM 222 is transmitted at the sequence stage 1213 via the LAN controller 218 to the control terminal 104.

Although not shown specifically in FIG. 12, if any fault is found in the file system used by the main processor 202 of the node 100a during the system start-up process for the main processor 202 and if the system start-up process is suspended, an operator recognizes this fault at the node 100a at the sequence stage 1214, from the node message 403 displayed on a display device at the control terminal 104 during the system start-up process for the main processor 202 of the node 100a, and enters a maintenance command such as UNIX fsck for inspecting the file system to conduct the maintenance of the node 100a.

If the main processor 202 of the node 100a outputs a panic message and shuts down during the normal processing by the main processor 202 of the node 100a after the normal completion of the system start-up process of the main processor 202 of the node 100a, an operator makes the node message 403 stored in RAM 222 of the system control adapter 105b be displayed on the control terminal 104. Therefore, the operator checks the cause of the system shut-down while referring to the contents of the node message 403.

For the disconnection of the node 100a, similar to the processes at the sequence stages 1210 to 1212, the software 301 of the control terminal 104 issues the "SET-CONNECT" command at the sequence stage 1215.

As the software 301 of the control terminal 104 issues the "SET-CONNECT" command, the system control adapter 105a of the control terminal 104 enters the disconnection state 800, and the system control adapter 105a of the control terminal 104 performs the calling control 804 relative to the system control adapter 105b of the node 100a.

At the sequence stage 1217, the system control adapter 105b of the node 100a recognizes the disconnection request, from the calling control 804 by the system control adapter 105a of the control terminal 104, and immediately reports this to the sub-processor 212 by the "REPORT-CONNECT" command.

As above, the control terminal 104 can perform the control of the main power source 200 of each node 100a to 100c and can perform the status monitor of each node 100a to 100c by transmitting the system control command from the control terminal 104 to the node 100a to 100c.

As described above, in the management system for the parallel computer system of this embodiment, the sub-processor 212 performs the mode transition between the packet mode 701 and non-packet mode 702. Therefore, without using specific hardware such as a switch system, the control terminal 104 can perform packet communications of the system command and its response with a plurality of nodes 100a to 100c and can perform communications of the node messages 403 with a particular node with the established connection.

Furthermore, in the management system for the parallel computer system of this embodiment, the node message output from the main processor 202 or sub-processor 212 of a specific node during its operation is stored and the control terminal 104 reads the stored node message 403. Therefore, even if the main processors 202 of a plurality of nodes 100a to 100c constituting the parallel computer system stop their operations after outputting the node messages 403, the control terminal 104 can collectively manage those node messages 403.

4th Embodiment

The fourth embodiment of a management system for a parallel computer system will be described wherein the bootstrap device is replaced if necessary while the system start-up process for the main processor 202 of the node 100a to 100c is performed.

In the management system for the parallel computer system of this embodiment, if the loading process from the bootstrap device abnormally terminates, the contents of the main memory 204 of the node 100a to 100c are changed through read/write, and the main processor 202 of the node 100a to 100c is reset. Thereafter, the loading process is again performed by using another bootstrap device.

In the management system for the parallel computer system of this embodiment, an "MS-READ" command and an "MS-WRITE" command are used for the read/write of the main memory 204 of the node 100a to 100c. These system control commands may be used also for checking the contents of the main memory 204 of the node 100a to 100c when a fault occurs while the main processor 202 of the node 100a to 100c performs ordinary parallel processing.

Further in the management system for the parallel computer system of this embodiment, a "REG-READ" command and a "REG-WRITE" command are used for the read/write of registers in a hardware module such as the main processor 202, sub-processor 212, and processor memory controller 205 respectively of the node 100a to 100c.

For example, if a fault occurs while the main processor 202 of the node 100a to 100c performs ordinary parallel processing, fault logs given by hardware resources of the node 100a to 100c are saved in a register and the control terminal 104 reads the fault logs by using the "REG-READ" command to locate the cause of the fault.

Also in the management system for the parallel computer system of this embodiment, the status code of the node 100a to 100c is read by using the "STATUS-READ" command, and if there is a node with system shut-down, a "PROC-RESET" command is transmitted to reset the main processor 202 of the node with the system shut-down and activate it again.

The system start-up process for the main processor 202 of the node 100a to 100c in the management system for the parallel computer system of this embodiment will be described.

Figure 13:
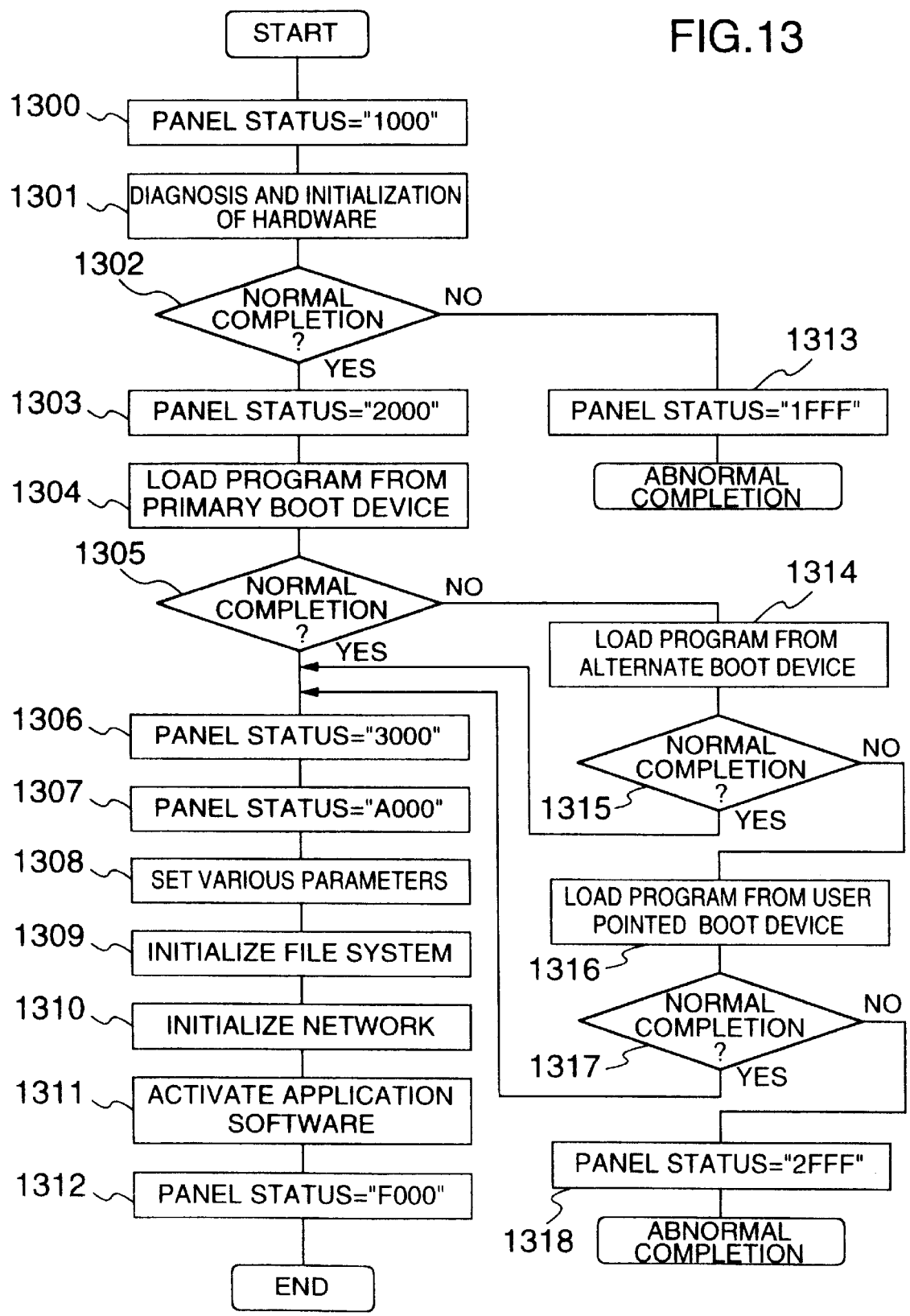
FIG. 13 is a flow chart illustrating the procedure of starting up the system for a main processor at each node of a management system for a parallel computer system according to a fourth embodiment.

FIG. 13 is a flow chart illustrating the system start-up process for the main processor 202 of the node 100a to 100c in the management system for the parallel computer system of this embodiment.

Figure 14:
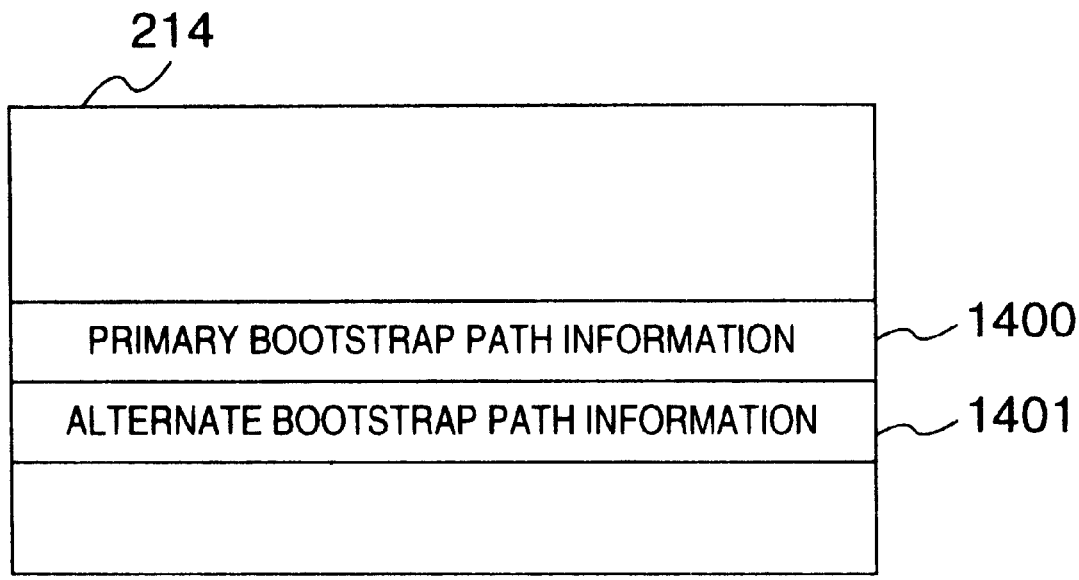
FIG. 14 is a memory map of an SRAM at each node of the management system for the parallel computer system of the fourth embodiment.

FIG. 14 is a memory map of SRAM 214 of each node 100a to 100c. In FIG. 14, reference numeral 1400 represents primary bootstrap path information, and reference numeral 1401 represents alternate bootstrap path information.

As shown in FIG. 14, the memory map of SRAM 214 of the node 100a to 100c of the management system for the parallel computer system of this embodiment contains the primary bootstrap path information 1400 indicating a first bootstrap device which stores the software 203 such as the operating system and the alternate bootstrap path information 1401 indicating a second bootstrap a second bootstrap device which is used when the first bootstrap device cannot be used.

As shown in FIG. 13, in the start-up process for the main processor 202 of the node 100a to 100c of the management system for the parallel computer system of this embodiment, when the main power source 200 is turned on in response to a power turn-on instruction from the control terminal 104, the main processor 202 executes the bootstrap program stored in the bootstrap ROM 210. At step 1300 the status code in the panel status management area of SRAM 214 is set to "1000", and at step 1301 each hardware module on the node 100a to 100c is diagnosed and initialized.

At step 1302 it is checked whether the hardware initial diagnosis and initialization at step 1301 are normally completed. If the hardware initial diagnosis and initialization at step 1301 are normally completed, the flow advances to step 1303.

If it is judged at step 1301 that the hardware initial diagnosis and initialization at step 1301 are abnormally completed, a status code "1FFF" is displayed on the panel of the node to indicate that the system start-up process for the main processor 202 of this node was abnormally terminated.

At step 1303 the status code is set to "2000". At step 1304, referring to the bootstrap path information shown in FIG. 14 among the hardware dependent information stored in SRAM 214, the software 203 such as an operating system is read from the bootstrap device (e.g., the system disk 207) pointed by the primary bootstrap path information 1400 and stored in the main memory 204.

The bootstrap path information in SRAM 214 can be referred to by the software 203 after it is copied in a specific area of the main memory 204 during the execution of the bootstrap program stored in the bootstrap ROM 210 and after the system is started up.

Also in the management system for the parallel computer system of this embodiment, the bootstrap device may be, in addition to the local file at its own node, a bootstrap file at another node which can be accessed via Ethernet (system control interface) by using a boot protocol (a base protocol for Request For Connect boot).

At step 1305 it is checked whether the load process of loading the software 203 such as an operating system from the bootstrap device pointed by the primary bootstrap path information 1400 has normally completed. If this loading process is succeeded, the flow advances to step 1306, whereas if it is failed, the flow advances to step 1314.

At step 1306 the status code is set to "3000", and the software 203 loaded in the main memory 204 is activated, and at step 1307 the status code is set to "A000". At step 1308 various system parameters are set. At step 1309 the file system is initialized, and at step 1310 the network such as TCP/IP is initialized.

In the management system for the parallel computer system of this embodiment, the system support interface is permitted to be used at this time, the system support interface using the functions of the software 203 such as an operating system and network software running on the main processor 202 of the node 100a to 100c.

At step 1311 the application software is activated, and at step 1312 the status code is set to "F000" to terminate the system start-up process for the main processor 202.

At step 1314, referring to the alternate bootstrap path information 1401 in SRAM 214, the software 203 such as an operating system is read from the bootstrap device (input/output device such as a DAT (Digital Audio Tape) although not shown in the management system for the parallel computer system of this embodiment) pointed by the alternate bootstrap path information, and loaded in the main memory 204.

At step 1315 it is checked whether the load process of reading the bootstrap device pointed by the alternate bootstrap path information 140 and loading it in the main memory 204 has been succeeded. If the load process is succeeded, the flow advances to step 1306.

If it is judged at step 1315 that the load process of reading the bootstrap device pointed by the alternate bootstrap path information 1401 and loading it in the main memory 204 has been failed, an operator designates at step 1316 a bootstrap device to perform the loading process.

It is checked at step 1317 whether the load process at step 1316 activated by the operator by pointing the bootstrap device is normally completed. If it is normally completed, the flow advances to step 1306, whereas if it is abnormally completed, the flow advances to step 1318 whereat the status code is set to "2FFF" to indicate that the system start-up process for the main processor was abnormally completed.

If the system start-up process for the main processor 202 of the node 100a to 100c is abnormally completed, the system start-up process is again executed by changing the bootstrap device as in the following.

The software 301 of the control terminal 104 refers to the specific area of the main memory 204 of the node 100a to 100c in which the bootstrap path information is stored, via the system control interface by using the "MS-READ" command, and identifies the bootstrap device failed in the system start-up of the main processor 202.

Next, the software 301 of the control terminal 104 writes the name of a bootstrap device different from the bootstrap device failed in the system start-up of the main processor 202, into the specific area of the main memory 204 of the node 100a to 100c in which the bootstrap path information is stored, via the system control interface by using the "MS-WRITE" command.

After the software 301 of the control terminal 104 overwrites the bootstrap path information in the main memory 204 of the node 100a to 100c at the specific area, it resets the main processor 202 of the node 100a to 100c by using the "PROC-RESET" command to again execute the system start-up process for the main processor 202. In this manner, the system start-up process with the changed bootstrap device can be performed.

The overwrite of the bootstrap path information may be performed also by the following method if the system start-up process for the main processor 202 of the node 100a to 100c is normally completed.

Specifically, the bootstrap path information in SRAM 214 of the node 100a to 100c can be overwritten by the software 203 of the node 100a to 100c. Therefore, the software 301 of the control terminal 104 instructs the software 203 of the node 100a to 100c via the system support interface to overwrite the bootstrap path information, and the instructed software 203 overwrites the bootstrap path information.

The software 203 of the node 100a to 100c notifies the changed bootstrap path information to the software 301 of the control terminal 104 via the system control interface. The software 301 of the control terminal 104 resets the main processor 202 of the node 100a to 100c via the system control interface by using the "PROC-RESET" command. In this manner, the loading process with the changed bootstrap path can be performed.

As described above, in the management system for the parallel computer system of this embodiment, the contents of the main memory 204 or registers of the node 100a to 100c are refereed to or changed in response to an instruction from the control terminal. Therefore, the control terminal 104 can collectively manage the contends of the main memories 204 of a plurality of nodes 100a to 100c constituting the parallel computer system when a fault occurs.

Also in the management system for the parallel computer system of this embodiment, the main processor 202 of the node 100a to 100c is reset in response to an instruction from the control terminal 104. Therefore, the control terminal 104 can collectively reset the main processors 202 of a plurality of nodes 100a to 100c constituting the parallel computer system.

Also in the management system for the parallel computer system of this embodiment, the control terminal 104 can divisionally use the sets of interface with the node 100a to 100c, and the bootstrap path information of the main memory 202 of the node 100a to 100c is changed in accordance with an instruction from the control terminal 104 to reset the main processor 202. Therefore, if a fault occurs in a specific bootstrap device among a plurality of nodes 100a to 100c constituting the parallel computer system, it is possible to perform the system start-up process for the main processor 202 of the node 100a to 100c by changing the bootstrap device in response to an instruction from the control terminal.

5th Embodiment

The fifth embodiment of a management system for parallel computer system will be described in which a plurality of control terminals are used to improve the system reliability.

Figure 15:
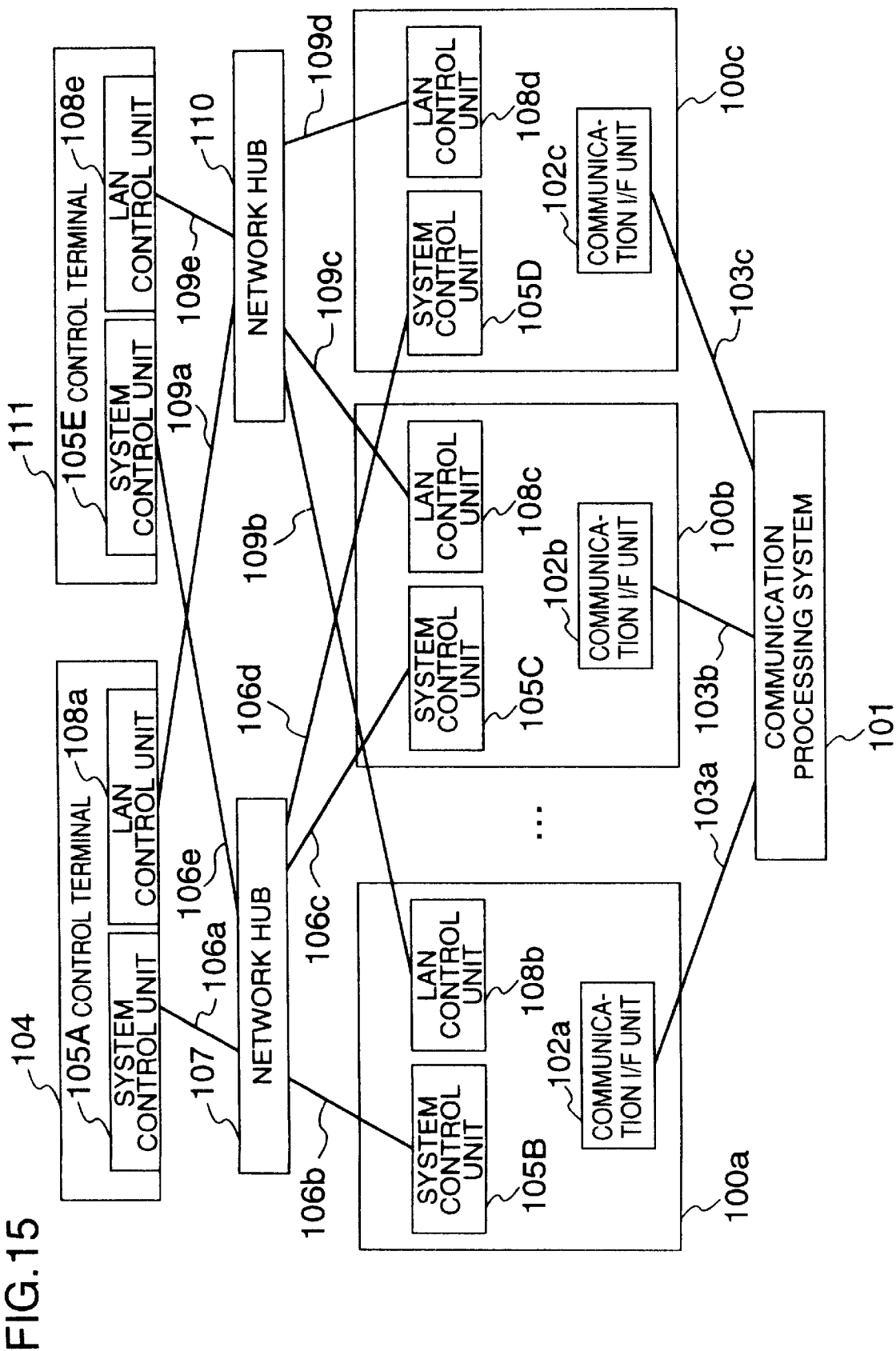
FIG. 15 is a diagram showing duplicate control terminals of a management system for a parallel computer system according to a fifth embodiment.

FIG. 15 shows the outline of the structure of the management system for the parallel computer system of the fifth embodiment which uses duplicate control terminals. In FIG. 15, reference numeral 105E represents a system control unit, reference numeral 106e represents a communication cable, reference numeral 108e represents a LAN control unit, reference numeral 109e represents a communication cable, and reference numeral 111 represents a control terminal.

As shown in FIG. 15, the management system for the parallel computer system of this embodiment has the control terminal 111, communication cable 106e, and communication cable 109e. The control terminal 111 has the system control unit 105E and LAN control unit 108e. The system control unit 105E of the control terminal 111 is connected via the communication cable 106e to the network hub 107, and the LAN control unit 108e of the control terminal 111 is connected via the communication cable 109e to the network hub 110.

In the management system for the parallel computer system of this embodiment, two control terminals 104 and 111 are used. When one control terminal has a fault, the other control terminal is used to continue the maintenance and management of the parallel computer system. If a plurality of control terminals are used at the same time for the maintenance and management of the parallel computer system, the contents of system control commands or adapter control commands transmitted from a plurality of control terminals may have conflict. It is therefore necessary to prevent conflict among a plurality of control terminals.

The procedure of preventing conflict during the operations of a plurality of control terminals of the management system for the parallel computer system of this embodiment will be described.

Figure 16:
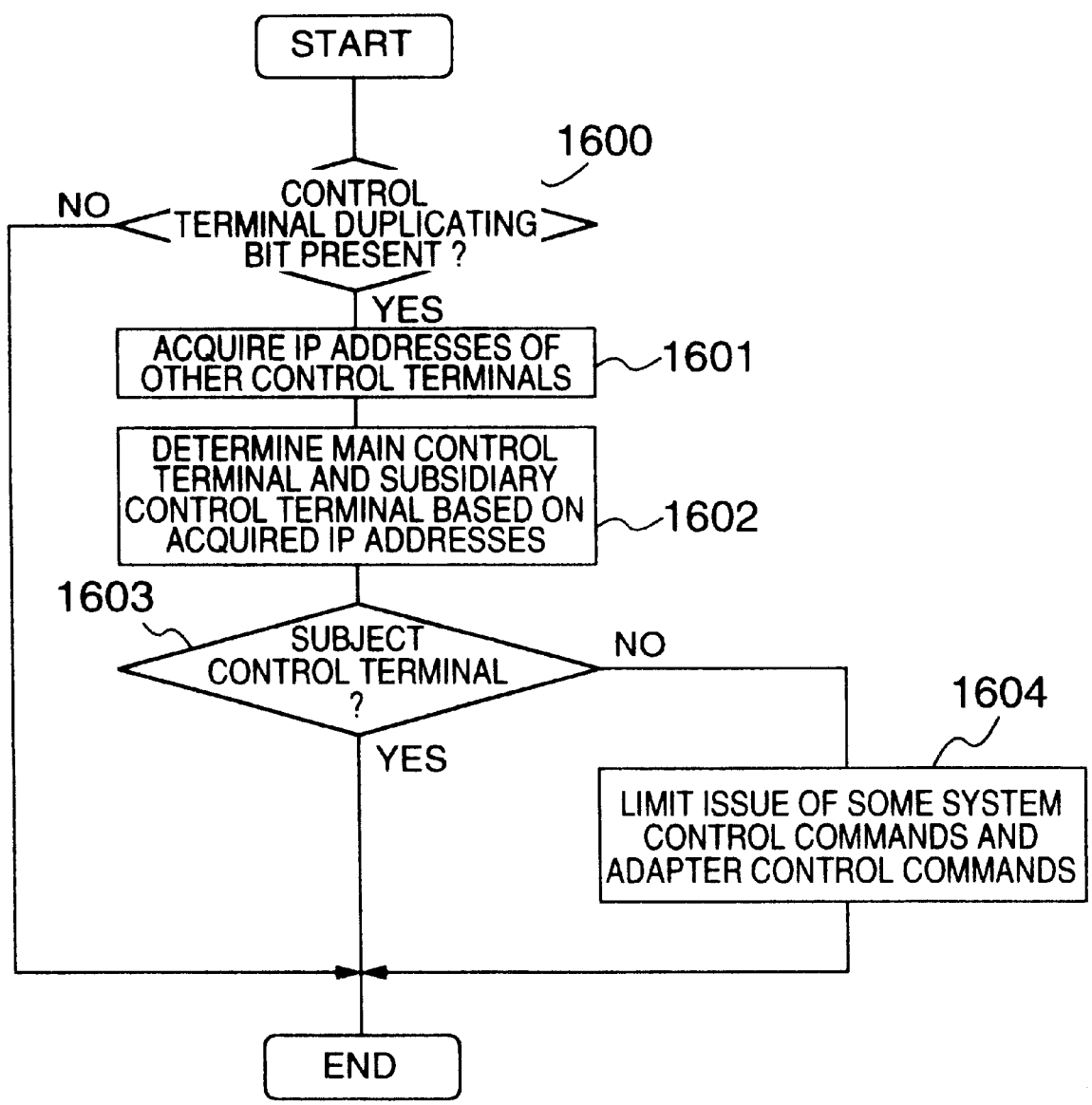
FIG. 16 is a flow chart illustrating the procedure of avoiding an operation conflict between a plurality of control terminals of the management system for the parallel computer system of the fifth embodiment.

FIG. 16 is a flow chart illustrating the procedure of prevention conflict during the operations of a plurality of control terminals of the management system for the parallel computer system of this embodiment.

In the management system for the parallel computer system of this embodiment, if the control terminals are duplicated, control terminal duplicating information is stored in advance in a memory area accessible by the software 301 of both the control terminals 104 and 111. In this manner, conflict of the duplicated control terminals can be avoided.

As shown in FIG. 16, in the procedure used when the control terminals are duplicated in the management system for the parallel computer system of this embodiment, at step 1600 the software 301 of both the control terminals 104 and 111 refers to a duplicating bit indicating that the control terminals are duplicated. If this bit is being set, the software 301 can recognize that the control terminals are duplicated.

At step 1601 an IP address of the other control terminal is acquired via the network (e.g., system support interface).

At step 1602, a main control terminal and a subsidiary control (sub-control) terminal supporting the main control terminal are determined. For example, the control terminal having the younger IP address is determined to be the main control terminal, and the other control terminal is determined to be the sub-control terminal.

In one case, only the main control terminal is operated, and when it has a fault, it is immediately switched to the subsidiary control terminal. In the other case, both the main and sub-control terminals are operated at the same time. In the latter case, the contents of system control commands and adapter control commands for controlling the nodes 100a to 100c transmitted from both the main and sub-control terminals may have conflict. The system control commands and adapter control commands transmitted from the sub-control terminal are therefore to be limited.

For example, at step 1603 it is checked if the subject control terminal is the main control terminal. If not the main control terminal, at step 1604, some system control commands (e.g., P-ON and P-OFF) and some adapter control commands (e.g., SET-CONNECT) are inhibited to be issued. In this manner, even if the contents of system control commands and adapter control commands for controlling the nodes 100a to 100c have conflict, integrity of the parallel computer system can be maintained.

As described above, in the management system for the parallel computer system of this embodiment, since a plurality of control terminals are provided, even if one control terminal has a fault, the maintenance and management of the parallel computer system can be continued and reliability of the parallel computer system can be improved.

Also in the management system for the parallel computer system of this embodiment, a main control terminal and subsidiary control terminals are selected from a plurality of control terminals. Therefore, conflict during the operations by a plurality of control terminals of the parallel computer system can be avoided.

6th Embodiment

The sixth embodiment of a management system for a parallel computer system will be described in which the control terminal is provided with a power turn-on logic unit operating with the auxiliary power source, and the main power source of the control terminal 104 is allowed to be turned on from a remote site so that the main power sources of the parallel computer system can be turned on.

Figure 17:
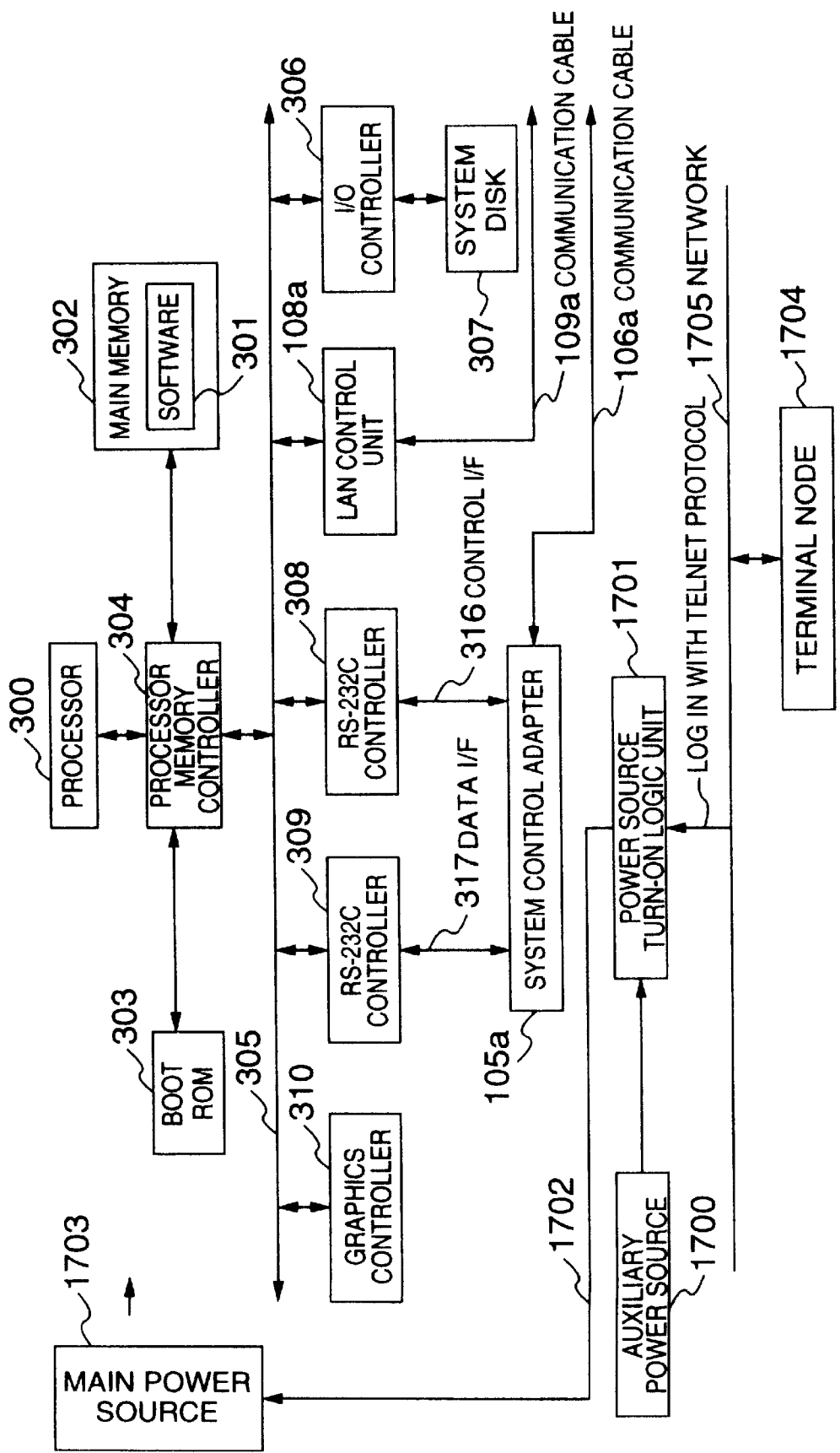
FIG. 17 shows the outline of the hardware structure of a control terminal of a management system for a parallel computer system according to a six embodiment, wherein the control terminal is provided with a power turn-on logic unit operating with an auxiliary power source.

FIG. 17 shows the outline of the hardware structure of the control terminal 104 of the management system for the parallel computer system of this embodiment provided with a power turn-on logic unit operating with the auxiliary power source. In FIG. 17, reference numeral 1700 represents an auxiliary power source, reference numeral 1701 represents a power turn-on logic unit, reference numeral 1702 represents a power source control signal, reference numeral 1703 represents a main power source, reference numeral 1704 represents a terminal node, and reference numeral 1705 represents a network.

As shown in FIG. 17, the control terminal 104 of the management system for the parallel computer system of this embodiment has the auxiliary power source 1700, power turn-on logic unit 1701, and main power source 1703. The power turn-on logic unit 1703 supplied with power from the auxiliary power source 1700 is connected to the main power source 1703 by the power control signal 1702, and connected to another terminal node 1704 via the network 1705.

As shown in FIG. 17, in the control terminal of the management system for the parallel computer system of this embodiment, the power turn-on logic unit 1701 is provided which is supplied with power from the auxiliary power source 1700. Although not specifically shown, the power turn-on logic unit 1701 is constituted by a network control unit, a power source control unit, a microprocessor, and the like. The power turn-on logic unit 1701 has a logic circuit which controls the main power source 1703 upon reception of a power control instruction from the network 1705.

With this power turn-on logic unit 1701, a remote control of the control terminal becomes possible as described in the following.

In the management system for the parallel computer system of this embodiment, the other terminal node 1704 logs in the power turn-on logic unit 1701 by using, for example, a Telnet protocol (in this case, the auxiliary power source 1700 of the control terminal 104 has been turned on).

Next, the terminal node 1704 issues a power-on command to the power turn-on logic unit 1702. With the received power-on command, the power turn-on logic unit 1701 recognizes an external power turn-on instruction, and outputs the power control signal 1702 to turn on the main power source 1703 of the control terminal 104.

As the main power source 1703 of the control terminal 104 is turned on, the bootstrap program stored in the bootstrap ROM 303 executes the system start-up process for the control terminal 104 and activates the software 301.

The power turn-on control described above may use the technique of U.S. Pat. No. 5,652,892 filed Oct. 17, 1994 and entitled "Method and Apparatus for Controlling Remote Power Source" by UGAJIN one of the present inventors. This disclosure is herein incorporated for reference.

Figure 18:
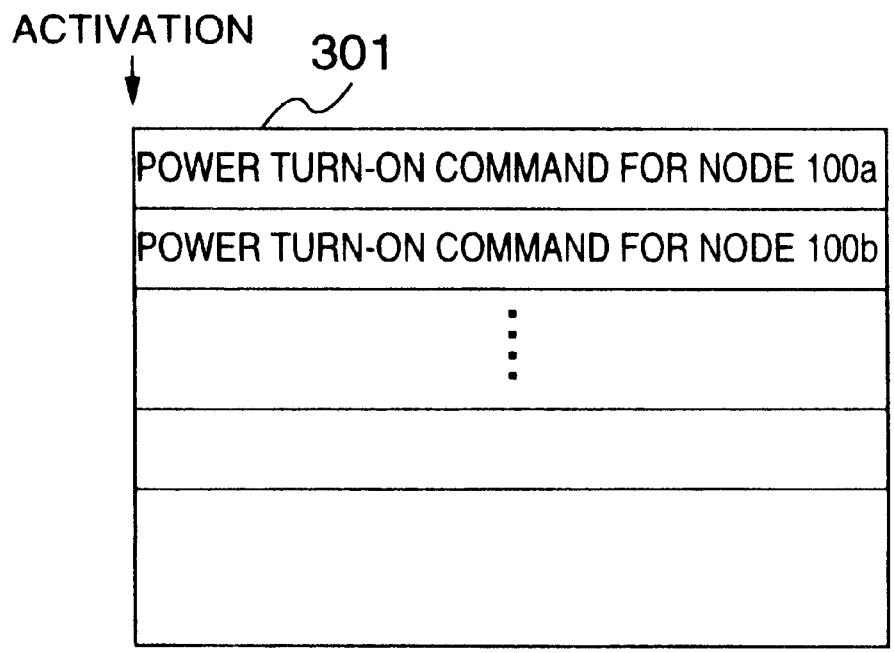
FIG. 18 illustrates a shell program for the control terminal of the management system for the parallel computer system of the sixth embodiment.

FIG. 18 shows an example of a shell program of the control terminal 104 of the management system for the parallel computer system of this embodiment. The shell program is a program for executing a set of procedures and describing command names and program names to be executed by a general-purpose operating system UNIX. In FIG. 18, in place of the command name and program name of UNIX, the functions of commands are written briefly.

As shown in FIG. 18, in the shell program to be executed for the system start-up for the control system of the management system for the parallel computer system of this embodiment, system control commands for instructing to turn on the main power source 200 of the nodes 100a to 100c are written in advance. When the main power source 1703 of the control terminal 104 is turned on, this shell program is executed.

In the above manner, upon activation of the control terminal 104, the main power sources 200 of the nodes 100a to 100c can be turned on and the system start-up process for the main processor 202 of the nodes 100a to 100c can be automatically executed.

As described above, according to the management system for the parallel computer system of this embodiment, it is possible to remotely access and turn on the main power source 1703 of the control terminal 104 and to activate the nodes 100a to 100c (to turn on the main power sources 200). Therefore, the maintenance and management of the parallel computer system can be remotely controlled.

Although not specifically shown in the drawings, the management system for the parallel computer system of the above embodiments is also applicable to the following systems.

(a) In a parallel computer system dedicated to perform a specific function wherein each node does not use a general-purpose operating system, and only the system control interface is used for the control of maintenance and management without using the network function of the general-purpose operating system.

According to the management system for the parallel computer system of this invention, the system control interface has the auxiliary power source and the network function independently from the processor to be controlled and does not use the network function of the general-purpose operating system such as TCP/IP. Therefore, the management system for the parallel computer system of this invention is also applicable to a parallel computer system dedicated to perform a specific function wherein whose nodes each do not use a general-purpose operating system.

(b) In a parallel computer system wherein each node is not provided with a function of operating with the auxiliary power source or with a limited function of operating with the auxiliary power source, the maintenance and management are controlled by using only the system support interface without using the auxiliary power source.

In this case, the function of the system control interface such as turning on the main power source excepting the functions essential to the auxiliary power source is provided by the system support interface.

It is possible to improve reliability of the communication processing system among nodes. The method of realizing this may use the technique of U.S. Pat. No. 5,636,341 filed Jun. 7, 1995 and entitled "FAULT PROCESSING METHOD AND INFORMATION PROCESSING SYSTEM" by the present inventors, which is incorporated herein by reference.

The present invention has been described in connection with the preferred embodiments. The invention is not limited only to the above embodiments. It is apparent to those skilled in the art that various modifications, improvements, combinations and the like can be made without departing from the scope of the appended claims.

What is claimed is:

1. A management system having a control terminal for performing maintenance and management of a parallel computer system with a plurality of computers constituting nodes being connected together,
   each of the plurality of nodes comprising:
      a main processor operated with a main power source of the node for performing parallel processing;
      a LAN control unit for managing application software of the node under control of said control terminal; and
      a system control unit for managing hardware of the node, said system control unit and said LAN control unit being connected to said control terminal via separate, respective networks, said system control unit comprising:
         a sub-processor operated with an auxiliary power source of the node for executing a system control command for controlling the main processor; and
         a system control adapter operated for communications with the control terminal for the system control and for controlling the sub-processor, said system control adapter including means for interpreting the control command from the control terminal to generate control data adapted for respective hardware of the node and to supply the generated control data to said hardware;
   said control terminal comprising a system control adapter for communication with a plurality of system control adapters of the plurality of nodes; and
   said nodes comprising a system control interface for connecting the plurality of system control adapters of the plurality of nodes to the system control adapter of the control terminal and for transmitting the system control command for the maintenance and management of a plurality of main processors of the plurality of nodes, from the control terminal to a plurality of system control adapters of the plurality of nodes.

2. A management system for a parallel computer system according to claim 1, wherein each sub-processor of the plurality of nodes has a function of turning on or off the main power source of each node, and the control terminal comprises means for transmitting a system control command to the system control adapters of the plurality of nodes to collectively or singularly turn on or off the main power sources of the sub-processors.

3. A management system for a parallel computer system according to claim 2, wherein the control terminal comprises means for singularly transmitting a system control command to each of the system control adapters of the plurality of nodes at a preset time interval to singularly turn on each main power source of the plurality of nodes.

4. A management system for a parallel computer system according to claim 1, wherein the control terminal comprises abnormal state detecting means for judging, if a normal response to a specific system control command transmitted to the system control adapter of a specific node among the plurality of nodes is not received in a preset time duration, that an abnormal state is occurring at the specific node.

5. A management system for a parallel computer system according to claim 1, wherein each system control adapter of the plurality of nodes comprises means for storing a node message output from the main processor or sub-processor of the node, and the control terminal comprises means for reading the node message stored at the system control adapter of the node.

6. A management system for a parallel computer system according to claim 1, wherein each sub-processor of the plurality of nodes comprises means for referring to or changing the contents of the main memory or registers of the node, and the control terminal comprises means for transmitting a system control command to each system control adapter of the plurality of nodes to refer to or change the contents of the main memory or registers of the node.

7. A management system for a parallel computer system according to claim 1, wherein each sub-processor of the plurality of nodes comprises means for resetting the main processor of the node, and the control terminal comprises means for transmitting a system control command to the system control adapter of the node to reset the main processor of the node.

8. A management system for a parallel computer system according to claim 1, wherein each sub-processor of the plurality of nodes comprises means for referring to or changing the contents of the main memory or registers of the node and means for resetting the main processor of the node, and the control terminal comprises means for transmitting a system control command for referring to or change the name of a bootstrap device and a system command for resetting the main processor of the node.

9. A management system for a parallel computer system according to claim 1, wherein a plurality of control terminals are prepared and the management system comprises means for limiting the functions of some control terminals among the plurality of control terminals.

10. A management system for a parallel computer system according to claim 1, wherein the control terminal comprises a power turn-on logic unit operated with the auxiliary power source for turning on the main power source of the control terminal upon input of a specific signal and means for transmitting a system control command to the system control adapters of the plurality of nodes to collectively or singularly turn on the main power source of each node after the main power source of the control terminal is turned on by the power turn-on logic unit.

11. A management system for a parallel computer system according to claim 1, wherein said interpreting means has a function of changing a transmission rate of said control data within the node independently of the transmission rate in the system control interface.

12. A management system for parallel computer system according to claim 11, wherein said interpreting means includes a function of controlling transmission of a message from said main processor based on interpretation of the system control command.

13. A method of configuring a management system having a control terminal for the maintenance and management of a parallel computer system with a plurality of computers constituting nodes being connected together, comprising the steps of:

providing each of the plurality of nodes with:
a main processor operated with a main power source of the node for performing parallel processing;
a LAN control unit for managing application software of the node under control of said control terminal;
a system control unit for managing hardware of the node, said system control unit and said LAN control unit being connected to said control terminal via separate, respective networks, said system control unit comprising:
a sub-processor operated with an auxiliary power source of the node for executing a system control command for controlling the main processor; and
a system control adapter operated for communications with the control terminal for the system control and for controlling the sub-processor, said system control adapter including means for interpreting the control command from the control terminal to generate control data adapted for respective hardware of the node and supply the generated control data to said hardware;
providing the control terminal with a system control adapter for communication with a plurality of system control adapters of the plurality of nodes; and
connecting via a system control interface the plurality of system control adapters of the plurality of nodes to the system control adapter of the control terminal and transmitting the system control command for the maintenance and management of a plurality of main processors of the plurality of nodes, from the control terminal to a plurality of system control adapters of the plurality of nodes.

14. A method of configuring the management system according to claim 13, wherein the system control command to be transmitted from the control terminal includes a system control command to be transmitted to the system control adapters of the plurality of nodes to collectively or singularly turn on or off the main power sources of the plurality of nodes.

15. A method of configuring a management system according to claim 14, wherein the control terminal singularly transmits a system control command to each of the system control adapters of the plurality of nodes at a preset time interval to singularly turn on each main power source of the plurality of nodes.

16. A method of configuring a management system according to claim 13, wherein the control terminal judges, if a normal response to a specific system control command transmitted to the system control adapter of a specific node among the plurality of nodes is not received in a preset time duration, that an abnormal state is occurring at the specific node.

17. A method of configuring a management system according to claim 13, wherein each system control adapter of the plurality of nodes stores a node message output from the main processor or sub-processor of the node, and the control terminal reads the node message stored at the system control adapter of the node.

18. A method of configuring a management system according to claim 13, wherein each sub-processor of the plurality of nodes refers to or changes the contents of the main memory or registers of the node, and the control terminal transmits a system control command to each system control adapter of the plurality of nodes to refer to or change the contents of the main memory or registers of the node.

19. A method of configuring a management system according to claim 13, wherein each sub-processor of the plurality of nodes resets the main processor of the node, and the control terminal transmits a system control command to the system control adapter of the node to reset the main processor of the node.

20. A method of configuring a management system according to claim 13, wherein each sub-processor of the plurality of nodes refers to or changes the contents of the main memory or registers of the node and resets the main processor of the node, and the control terminal transmits a system control command for referring to or change the name of a bootstrap device and a system command for resetting the main processor of the node.

21. A method of configuring a management system according to claim 13, wherein a plurality of control terminals are prepared and the management system limits the functions of some control terminals among the plurality of control terminals.

22. A method of configuring a management system according to claim 13, wherein the control terminal comprises a power turn-on logic unit operated with the auxiliary power source for turning on the main power source of the control terminal upon input of a specific signal and transmits a system control command to the system control adapters of the plurality of nodes to collectively or singularly turn on the main power source of each node after the main power source of the control terminal is turned on by the power turn-on logic unit.

23. A management system for managing a parallel computer system having a plurality of computers constituting nodes, system control interface for configuring the parallel computer system by connecting the nodes together, and a control terminal for performing maintenance and management of the parallel computer system, each of the plurality of nodes comprising:
a main processor operated with a main power source of the node for performing parallel processing;
a LAN control unit for managing application software of the node under control of said control terminal; and
a system control unit for controlling the hardware of the node, said system control unit and said LAN control unit being connected to said control terminal via separate, respective networks, said system control unit including:
a sub-processor operated with an auxiliary power source of the node for executing a system control command for controlling the main processor, and
a system control adapter operated for communications with the control terminal for the hardware control and for controlling the sub-processor, said system control adapter including means for interpreting the control command from the control terminal to generate control data adapted for respective hardware of the node and supply the generated control data to said hardware;

said control terminal comprising a system control adaptor for communication with a plurality of system control adapters of the plurality of nodes; and said system control interface connecting the plurality of system control adapters of the plurality of nodes to the system control adapter of the control terminal, and said control terminal transmitting the system control command for the maintenance and management of a plurality of main processors of the plurality of nodes, to a plurality of system control adapters of the plurality of nodes under the control of the node system control adapters.

24. A node used for a management system for a parallel computer system having a plurality of computers constituting nodes, a system control interface for configuring the parallel computer system by connecting the nodes together, and a control terminal for the maintenance and management of the parallel computer system, said node comprising:
a main processor operated with a main power source of the node for performing parallel processing,
a LAN control unit for managing application software of the node under control of said control terminal, and
a system control unit for managing the hardware of the node, said system control unit and said LAN control unit being connected to said control terminal via separate, respective networks, said system control unit including:
a sub-processor operated with an auxiliary power source of the node for executing a system control command for controlling the main processor, and
an intelligent system control adapter operated for communications with the control terminal for the hardware management and for controlling the sub-processor, said intelligent system control adapter including means for interpreting the control command from the control terminal to generate control data adapted for respective hardware of the node and supply the generated control data to said hardware;

said intelligent system control adapter connected via the system control interface connecting the plurality of system control adapters of the plurality of nodes to the system control adapter of the control terminal, receives the system control command for the maintenance and management of a plurality of main processors from the control terminal, analyzes the system control command to generate control data, and transmits the system control command to the intelligent system control adapter.

25. A management system having a control terminal for performing maintenance and management of a parallel computer system with a plurality of computers constituting nodes being connected together, each of the plurality of nodes comprising:
a LAN control unit for managing application software for the node under control by said terminal controller;
a main processor operated with a main power source of the node for performing parallel processing; and
a system control unit for managing hardware of the node, said system control unit and said LAN control unit being connected to said terminal controller via separate, respective networks, said system control unit comprising:
a sub-processor executing a system control command from said control terminal to control at least start and reset operations of the main processor; and
a system control adapter operated with the control terminal for the system control and for controlling the sub-processor, said system control adapter including means for interpreting the control command from the control terminal to generate control data adapted for respective resources of the node and supply the generated control data to said resources and changing a transmission rate of said control data within the node independently of that in the system control interface;

said control terminal comprising a system control adapter for communication with a plurality of system control adapters of the plurality of nodes; and said node comprising a system control interface for connecting the plurality of system control adapters of the plurality of nodes to the system control adapter of the control terminal and for transmitting the system control command for the maintenance and management of a plurality of main processors of the plurality of nodes, from the control terminal to a plurality of system control adapters of the plurality of nodes.

* * * * *